United States Patent
Sodagar et al.

(10) Patent No.: US 11,360,263 B2
(45) Date of Patent: Jun. 14, 2022

(54) SELF-ALIGNED SPOT SIZE CONVERTER

(71) Applicant: Skorpios Technologies, Inc., Albuquerque, NM (US)

(72) Inventors: Majid Sodagar, Albuquerque, NM (US); Paveen Apiratikul, Albuquerque, NM (US)

(73) Assignee: Skorpios Technologies. Inc., Albuquerque, NM (US)

( * ) Notice: Subject to any disclaimer, the term of this patent is extended or adjusted under 35 U.S.C. 154(b) by 0 days.

(21) Appl. No.: 16/777,727

(22) Filed: Jan. 30, 2020

(65) Prior Publication Data

US 2020/0301072 A1 Sep. 24, 2020

Related U.S. Application Data

(60) Provisional application No. 62/799,581, filed on Jan. 31, 2019.

(51) Int. Cl.
*G02B 6/12* (2006.01)
*G02B 6/122* (2006.01)
*G02B 6/136* (2006.01)

(52) U.S. Cl.
CPC ........... *G02B 6/1228* (2013.01); *G02B 6/136* (2013.01); *G02B 2006/12061* (2013.01); *G02B 2006/12097* (2013.01)

(58) Field of Classification Search
CPC ........ G02B 6/1228; G02B 6/26; G02B 6/305; G02B 6/136
See application file for complete search history.

(56) References Cited

U.S. PATENT DOCUMENTS

| | | |
|---|---|---|
| 4,182,545 A | 1/1980 | Greer |
| 4,293,826 A | 10/1981 | Scifres et al. |
| 4,389,567 A | 6/1983 | Khoe |
| 4,773,720 A | 9/1988 | Hammer |
| 4,799,749 A | 1/1989 | Borner |
| 4,886,538 A | 12/1989 | Mahapatra |
| 4,932,032 A | 6/1990 | Koch |

(Continued)

FOREIGN PATENT DOCUMENTS

| | | |
|---|---|---|
| CN | 101637007 A | 1/2010 |
| CN | 10-6133999 A | 11/2016 |

(Continued)

OTHER PUBLICATIONS

U.S. Appl. No. 16/839,826 received a Notice of Allowance dated Mar. 26, 2021, 11 pages.

(Continued)

*Primary Examiner* — Sung H Pak
*Assistant Examiner* — Hoang Q Tran
(74) *Attorney, Agent, or Firm* — Kilpatrick Townsend & Stockton LLP

(57) ABSTRACT

An optical device comprises a substrate, a waveguide disposed on the substrate, and a spot size converter (SSC) disposed on the substrate. The waveguide comprises a shoulder and a ridge. The SSC comprises a shoulder and a ridge. The ridge of the waveguide is aligned to a first stage of the ridge of the SSC. The waveguide is made of a first material. The shoulder and the ridge of the SSC are made of a second material. The second material is different from the first material.

12 Claims, 27 Drawing Sheets

(56) References Cited

U.S. PATENT DOCUMENTS

| | | |
|---|---|---|
| 5,078,516 A | 1/1992 | Kapon |
| 5,190,883 A | 3/1993 | Menigaux et al. |
| 5,319,667 A | 6/1994 | Dutting et al. |
| 5,333,219 A | 7/1994 | Kuznetsov |
| 5,454,058 A | 9/1995 | Mace et al. |
| 5,574,742 A | 11/1996 | Ben-Michael |
| 5,579,424 A | 11/1996 | Schneider |
| 5,586,209 A | 12/1996 | Matsuura |
| 5,633,512 A | 5/1997 | Okuda |
| 5,745,614 A | 4/1998 | Kersten et al. |
| 5,818,989 A | 10/1998 | Makamura |
| 5,838,070 A | 11/1998 | Naruse et al. |
| 5,858,814 A | 1/1999 | Goossen et al. |
| 5,981,400 A | 11/1999 | Lo |
| 5,987,046 A | 11/1999 | Kobayashi |
| 5,987,050 A | 11/1999 | Doerr et al. |
| 6,101,210 A | 8/2000 | Bestwick et al. |
| 6,108,478 A | 8/2000 | Harpin |
| 6,118,978 A | 9/2000 | Ihmels |
| 6,192,058 B1 | 2/2001 | Abeles |
| 6,229,792 B1 | 5/2001 | Anderson et al. |
| 6,229,947 B1 | 5/2001 | Vawter |
| 6,310,995 B1 | 10/2001 | Saini |
| 6,316,281 B1 | 11/2001 | Lee |
| 6,339,606 B1 | 1/2002 | Alphonse |
| 6,509,139 B1 | 1/2003 | Roberts |
| 6,571,039 B1 | 5/2003 | Al-hemyari |
| 6,690,857 B2 | 2/2004 | Zhao et al. |
| 6,714,566 B1 | 3/2004 | Coldren et al. |
| 6,728,279 B1 | 4/2004 | Sarlet et al. |
| 6,768,855 B1 | 7/2004 | Bakke et al. |
| 6,829,561 B2 | 12/2004 | Keller et al. |
| 6,846,694 B2 | 1/2005 | Fukushima et al. |
| 6,888,989 B1 | 5/2005 | Zhou et al. |
| 6,931,178 B2 | 8/2005 | Saccomanno |
| 6,956,983 B2 | 10/2005 | Morse |
| 6,987,919 B2 | 1/2006 | Luo |
| 7,006,746 B2 | 2/2006 | Blalock |
| 7,016,560 B2 | 3/2006 | Ticknor |
| 7,058,096 B2 | 6/2006 | Sarlet et al. |
| 7,079,727 B1 * | 7/2006 | Little .............. G02B 6/1228 385/130 |
| 7,082,235 B2 | 7/2006 | Gunn, III |
| 7,088,890 B2 | 8/2006 | Liu |
| 7,120,336 B2 | 10/2006 | Sandhu |
| 7,251,406 B2 | 7/2007 | Luo |
| 7,257,283 B1 | 8/2007 | Liu et al. |
| 7,317,853 B2 | 1/2008 | Laurent-Lund |
| 7,323,353 B2 | 1/2008 | Sandhu |
| 7,326,611 B2 | 2/2008 | Forbes |
| 7,359,588 B2 | 4/2008 | Kang |
| 7,359,607 B2 | 4/2008 | Blalock |
| 7,392,247 B2 | 6/2008 | Chen et al. |
| 7,464,147 B1 | 12/2008 | Fakhouri et al. |
| 7,519,257 B2 | 4/2009 | Lipson et al. |
| 7,531,395 B2 | 5/2009 | Blomiley et al. |
| 7,539,373 B1 | 5/2009 | Logvin |
| 7,598,527 B2 | 10/2009 | Behfar et al. |
| 7,633,988 B2 | 12/2009 | Fish et al. |
| 7,643,710 B1 | 1/2010 | Liu |
| 7,701,985 B2 | 4/2010 | Webster et al. |
| 7,720,341 B2 | 5/2010 | Blalock |
| 7,796,656 B2 | 9/2010 | Watson |
| 7,831,116 B2 | 11/2010 | Kim |
| 7,936,955 B2 | 5/2011 | Blalock |
| 7,939,934 B2 | 5/2011 | Haba et al. |
| 7,972,875 B2 | 7/2011 | Rogers et al. |
| 8,025,444 B2 | 9/2011 | Choi et al. |
| 8,106,379 B2 | 1/2012 | Bowers |
| 8,170,383 B2 | 5/2012 | Tokushima |
| 8,195,020 B2 | 6/2012 | Sandhu |
| 8,222,084 B2 | 7/2012 | Dallesasse et al. |
| 8,254,735 B2 | 8/2012 | Tsai |
| 8,271,205 B2 | 9/2012 | Reja et al. |
| 8,290,014 B2 | 10/2012 | Junesand et al. |
| 8,320,721 B2 | 11/2012 | Cevini et al. |
| 8,483,528 B2 | 7/2013 | Socci et al. |
| 8,488,923 B2 | 7/2013 | Na |
| 8,542,763 B2 | 9/2013 | Forenza et al. |
| 8,620,230 B2 | 12/2013 | Sanderovitz et al. |
| 8,913,860 B2 | 12/2014 | Ushida |
| 9,042,697 B2 | 5/2015 | Sandhu |
| 9,075,192 B2 | 7/2015 | Adams |
| 9,097,846 B2 | 8/2015 | Mizrahi et al. |
| 9,195,001 B2 | 11/2015 | Hatori et al. |
| 9,268,088 B2 | 2/2016 | Mizrahi et al. |
| 9,274,282 B2 | 3/2016 | Kachru |
| 9,316,785 B2 | 4/2016 | Krasulick et al. |
| 9,316,792 B2 | 4/2016 | Park |
| 9,348,099 B2 | 5/2016 | Krishnamurthi et al. |
| 9,354,396 B2 | 5/2016 | Baudot |
| 9,429,693 B2 | 8/2016 | Takahashi et al. |
| 9,460,740 B1 | 10/2016 | Staffaroni |
| 9,529,151 B2 | 12/2016 | Goi et al. |
| 9,625,651 B2 | 4/2017 | Kumar |
| 9,658,401 B2 | 5/2017 | Li et al. |
| 9,810,846 B2 | 11/2017 | Taillaert |
| 9,885,832 B2 | 2/2018 | Li et al. |
| 9,933,575 B2 | 4/2018 | Kumar |
| 9,977,188 B2 | 5/2018 | Lambert et al. |
| 10,001,600 B2 | 6/2018 | Li et al. |
| 10,209,451 B2 | 2/2019 | Kumar et al. |
| 10,345,521 B2 | 6/2019 | Li et al. |
| 10,649,148 B2 | 5/2020 | Sodagar et al. |
| 2001/0010743 A1 | 8/2001 | Cayrefourcq et al. |
| 2001/0026670 A1 | 10/2001 | Takizawa |
| 2001/0036681 A1 | 11/2001 | Iwai et al. |
| 2002/0039469 A1 | 4/2002 | Jeong |
| 2002/0064337 A1 | 5/2002 | Behin et al. |
| 2002/0097962 A1 | 7/2002 | Yoshimura et al. |
| 2002/0131744 A1 | 9/2002 | Evans |
| 2002/0197013 A1 | 12/2002 | Liu et al. |
| 2003/0035446 A1 | 2/2003 | Griffel |
| 2003/0042494 A1 | 3/2003 | Worley |
| 2003/0081877 A1 | 5/2003 | Nakata et al. |
| 2003/0128724 A1 | 7/2003 | Morthier |
| 2003/0129660 A1 | 7/2003 | Zien et al. |
| 2003/0138216 A1 | 7/2003 | Shimoda |
| 2003/0210725 A1 | 11/2003 | Prassas |
| 2004/0017962 A1 | 1/2004 | Lee et al. |
| 2004/0017976 A1 | 1/2004 | Luo |
| 2004/0022223 A1 | 2/2004 | Billhartz |
| 2004/0037342 A1 | 2/2004 | Blauvelt et al. |
| 2004/0062485 A1 | 4/2004 | Kelly |
| 2004/0066999 A1 | 4/2004 | Sakamoto et al. |
| 2004/0077135 A1 | 4/2004 | Fan et al. |
| 2004/0111397 A1 | 6/2004 | Chen et al. |
| 2004/0114872 A1 | 6/2004 | Nagai |
| 2004/0120646 A1 | 6/2004 | Fushimi |
| 2004/0120648 A1 | 6/2004 | Kwon |
| 2004/0120675 A1 | 6/2004 | Skinner et al. |
| 2004/0165812 A1 | 8/2004 | Blauvelt |
| 2004/0182914 A1 | 9/2004 | Venugopalan |
| 2004/0202440 A1 | 10/2004 | Gothoskar |
| 2004/0228384 A1 | 11/2004 | Oh et al. |
| 2004/0245425 A1 | 12/2004 | Delpiano et al. |
| 2004/0258360 A1 | 12/2004 | Lim |
| 2004/0259279 A1 | 12/2004 | Erchak et al. |
| 2004/0264840 A1 | 12/2004 | Mule et al. |
| 2005/0033858 A1 | 2/2005 | Swildens et al. |
| 2005/0058416 A1 | 3/2005 | Lee et al. |
| 2005/0082552 A1 | 4/2005 | Fang et al. |
| 2005/0105853 A1 | 5/2005 | Liu et al. |
| 2005/0123244 A1 | 6/2005 | Block et al. |
| 2005/0185893 A1 | 8/2005 | Liu et al. |
| 2005/0202554 A1 | 9/2005 | Luo et al. |
| 2005/0211465 A1 | 9/2005 | Sunohara |
| 2005/0211993 A1 | 9/2005 | Sano et al. |
| 2005/0213618 A1 | 9/2005 | Sochava et al. |
| 2005/0226284 A1 | 10/2005 | Tanaka et al. |
| 2005/0286426 A1 | 12/2005 | Padhye et al. |
| 2006/0002443 A1 | 1/2006 | Farber et al. |
| 2006/0045157 A1 | 3/2006 | Ratowsky |
| 2006/0093002 A1 | 5/2006 | Park et al. |

(56) References Cited

U.S. PATENT DOCUMENTS

| | | |
|---|---|---|
| 2006/0104322 A1 | 5/2006 | Park et al. |
| 2006/0109542 A1 | 5/2006 | Mizuuchi |
| 2006/0115215 A1 | 6/2006 | Liu |
| 2006/0285797 A1 | 12/2006 | Little |
| 2007/0002924 A1 | 1/2007 | Hutchinson et al. |
| 2007/0223549 A1 | 9/2007 | Livshits |
| 2007/0280326 A1 | 12/2007 | Piede et al. |
| 2008/0002928 A1 | 1/2008 | Li |
| 2008/0266639 A1 | 10/2008 | Melloni et al. |
| 2009/0016399 A1 | 1/2009 | Bowers |
| 2009/0020499 A1 | 1/2009 | Nottola et al. |
| 2009/0087137 A1 | 4/2009 | Doan |
| 2009/0135861 A1 | 5/2009 | Webster et al. |
| 2009/0225796 A1 | 9/2009 | Kato |
| 2009/0267173 A1 | 10/2009 | Takahashi et al. |
| 2009/0278233 A1 | 11/2009 | Pinnington et al. |
| 2009/0294803 A1 | 12/2009 | Nuzzo et al. |
| 2009/0310140 A1 | 12/2009 | Smith et al. |
| 2010/0040327 A1 | 2/2010 | Deki et al. |
| 2010/0042668 A1 | 2/2010 | Liang et al. |
| 2010/0111128 A1 | 5/2010 | Qin et al. |
| 2010/0114846 A1 | 5/2010 | LaChapelle et al. |
| 2010/0123145 A1 | 5/2010 | Lee |
| 2010/0238855 A1 | 9/2010 | Yoshida et al. |
| 2010/0247037 A1 | 9/2010 | Little |
| 2010/0266288 A1 | 10/2010 | Little |
| 2010/0272385 A1 | 10/2010 | Akiyama |
| 2010/0302992 A1 | 12/2010 | Zhuang |
| 2011/0012261 A1 | 1/2011 | Choi et al. |
| 2011/0032964 A1 | 2/2011 | Sauer et al. |
| 2011/0044193 A1 | 2/2011 | Forenze et al. |
| 2011/0085572 A1 | 4/2011 | Dallesasse et al. |
| 2011/0085577 A1 | 4/2011 | Krasulick et al. |
| 2011/0085760 A1 | 4/2011 | Han et al. |
| 2011/0089524 A1 | 4/2011 | Nonagaki |
| 2011/0158584 A1 | 6/2011 | Popovic |
| 2011/0163444 A1 | 7/2011 | Hayashi |
| 2011/0165707 A1 | 7/2011 | Lott et al. |
| 2011/0205660 A1 | 8/2011 | Komura et al. |
| 2011/0211604 A1 | 9/2011 | Roscher |
| 2011/0216997 A1 | 9/2011 | Gothoskar et al. |
| 2011/0217002 A1 | 9/2011 | Mekis et al. |
| 2011/0267676 A1 | 11/2011 | Dallesasse et al. |
| 2012/0001166 A1 | 1/2012 | Doany et al. |
| 2012/0002694 A1 | 1/2012 | Bowers et al. |
| 2012/0002931 A1 | 1/2012 | Watanabe |
| 2012/0057079 A1 | 3/2012 | Dallesasse et al. |
| 2012/0057609 A1 | 3/2012 | Dallesasse et al. |
| 2012/0057610 A1 | 3/2012 | Dallesasse et al. |
| 2012/0057816 A1 | 3/2012 | Krasulick et al. |
| 2012/0091594 A1 | 4/2012 | Ladesberger et al. |
| 2012/0093456 A1 | 4/2012 | Taillaert et al. |
| 2012/0120978 A1 | 5/2012 | Budd et al. |
| 2012/0149148 A1 | 6/2012 | Dallesasse et al. |
| 2012/0170931 A1 | 6/2012 | Evans et al. |
| 2012/0189317 A1 | 7/2012 | Heck et al. |
| 2012/0224813 A1 | 9/2012 | Chen et al. |
| 2012/0230635 A1 | 9/2012 | Yoshida |
| 2012/0264256 A1 | 10/2012 | Dallesasse et al. |
| 2012/0320939 A1 | 12/2012 | Baets et al. |
| 2012/0321244 A1 | 12/2012 | Suzuki et al. |
| 2013/0022312 A1 | 1/2013 | Taillaert et al. |
| 2013/0037905 A1 | 2/2013 | Shubin et al. |
| 2013/0051727 A1 | 2/2013 | Mizrahi et al. |
| 2013/0107741 A1 | 5/2013 | Huang et al. |
| 2013/0114924 A1 | 5/2013 | Loh |
| 2013/0170793 A1* | 7/2013 | Ushida ............... G02B 6/26 385/43 |
| 2013/0210214 A1 | 8/2013 | Dallesasse et al. |
| 2013/0216177 A1 | 8/2013 | Tseng et al. |
| 2013/0251299 A1 | 9/2013 | He et al. |
| 2013/0266263 A1 | 10/2013 | Kwon et al. |
| 2013/0301975 A1 | 11/2013 | Spann et al. |
| 2013/0302920 A1 | 11/2013 | Dallesasse et al. |
| 2014/0064658 A1 | 3/2014 | Ramaswamy et al. |
| 2014/0133817 A1 | 5/2014 | Lealman |
| 2014/0179036 A1 | 6/2014 | Krasulick et al. |
| 2014/0252411 A1 | 9/2014 | Kang et al. |
| 2014/0270620 A1 | 9/2014 | Anderson |
| 2014/0319656 A1 | 10/2014 | Marchena et al. |
| 2015/0086153 A1 | 3/2015 | Ono |
| 2015/0097211 A1 | 4/2015 | Krasulick et al. |
| 2015/0219853 A1 | 8/2015 | Kumar et al. |
| 2015/0234124 A1 | 8/2015 | Tseng et al. |
| 2015/0253471 A1 | 9/2015 | Takahashi |
| 2015/0253472 A1 | 9/2015 | Kumar et al. |
| 2015/0316723 A1 | 11/2015 | Taylor |
| 2015/0346429 A1 | 12/2015 | Lambert et al. |
| 2015/0346430 A1* | 12/2015 | Li ..................... G02B 6/132 385/28 |
| 2015/0362673 A1 | 12/2015 | Xuezhe et al. |
| 2016/0124148 A1 | 5/2016 | Matsumoto |
| 2016/0170142 A1 | 6/2016 | Lambert |
| 2016/0306111 A1 | 10/2016 | Lambert |
| 2016/0306117 A1 | 10/2016 | Middlebrook |
| 2017/0090118 A1 | 3/2017 | Sodagar et al. |
| 2017/0242192 A1 | 8/2017 | Sodagar et al. |
| 2017/0351033 A1 | 12/2017 | Kumar |
| 2018/0356596 A1 | 12/2018 | Kumar |
| 2020/0301072 A1 | 9/2020 | Sodagar et al. |

FOREIGN PATENT DOCUMENTS

| | | |
|---|---|---|
| EP | 0696747 A2 | 2/1996 |
| EP | 2141525 A1 | 10/2008 |
| EP | 2544319 A1 | 1/2013 |
| EP | 2648906 A1 | 10/2013 |
| EP | 2751603 A1 | 7/2014 |
| JP | 09197179 A | 7/1997 |
| JP | 2000-089054 A2 | 3/2000 |
| JP | 2003-078530 A | 3/2003 |
| JP | 2006-186446 A | 7/2006 |
| JP | 2007-074202 A | 3/2007 |
| JP | 2010-522372 A | 7/2010 |
| JP | 2010-199972 A | 9/2010 |
| JP | 2010-281899 A | 12/2010 |
| JP | 2011-075917 A | 4/2011 |
| JP | 2013-507792 A | 4/2013 |
| JP | 2014-525608 A | 9/2014 |
| KR | 2014/0060547 A | 5/2014 |
| KR | 2014/0060548 A | 5/2014 |
| TW | 2011-40975 A | 11/2011 |
| WO | 03/012512 A1 | 2/2003 |
| WO | 2010/033435 A2 | 3/2010 |
| WO | 2011/046898 A1 | 4/2011 |
| WO | 2012/078361 A1 | 6/2012 |
| WO | 2013/033252 A1 | 3/2013 |
| WO | 2013/109955 A1 | 7/2013 |
| WO | 2014/021411 A1 | 2/2014 |
| WO | 2014/025824 A2 | 2/2014 |
| WO | 2014/176561 A1 | 10/2014 |
| WO | 2015/054491 A1 | 4/2015 |
| WO | 2015/120260 A1 | 8/2015 |
| WO | 2015/134968 A1 | 9/2015 |
| WO | 2015/183992 A1 | 12/2015 |
| WO | 2016/172202 A1 | 10/2016 |

OTHER PUBLICATIONS

Analui et al.; "A Fully Integrated 20-GB/s Optoelectronic Transceiver Implemented in a Standard 0.13-mu-m CMOS SOI Technology", IEEE Journal of Solid State Circuits, vol. 41, No. 12, Dec. 2006, retrieved from the Internet <http://ieeexplore.ieee.org/xpls/abs_all.jsp?arnumber=4014595&tag=1>, 11 pages.

Barkai, A., et al., "Efficient Mode Converter for Coupling Between Fiber and Micrometer Size Silicon Waveguides." *IEEE*. 2007. pp. 49-51.

Coldren et al.; "Tunable Semiconductor Lasers: A Tutorial"; Journal of Lightwave Technology, Jan. 2004;22(1):193-202.

Coldren; "Monolithic Tunable Diode Lasers"; IEEE Journal on Selected Topics in Quantum Electronics, Nov./Dec. 2000; 6(6):988-999.

(56) References Cited

OTHER PUBLICATIONS

Hildebrand, et al.; "The Y-Laser: A Multifunctional Device for Optical Communication Systems and Switching Networks"; Journal of Lightwave Technology, Dec. 1993; 11(12):2066-2075.

Isaksson, et al.; "10 GB/s Direct Modulation of 40 nm Tunable Modulated-Grating Y-branch Laser"; in Optical Fiber Communication Conference and Exposition and The National Fiber Optic Engineers Conference, Technical Digest (CD) (Optical Society of America, 2005), paper OTuE2.

Khilo, A., et al., "Efficient Planar Fiber-to-Chip Coupler Based on Two-Stage Adiabatic Evolution." *Optics Express*. vol. 18, No. 15, Jul. 2010, pp. 15790-15806.

Kochem, et al., "Frequency Stabilized High Brightness Tapered Amplifier and Laser Modules", Proc of SPEI, vol. 6997 69971A-1, downloaded from: http://proceedings.spiedigitallibryry.org/ on Feb. 19, 2016, 11 pages.

Kuznetsov, et al.; "Asymmetric Y-Branch Tunable Semiconductor Laser with 1.0 THz Tuning Range"; IEEE Photonics Technology Letters, Oct. 1992; 4(10):1093-1095.

Laroy, et al.; "Characteristics of the New Modulated Grating Y laser (MG-Y) for Future WDM Networks"; Proceedings Symposium IEEE/LEOS Benelux Chapter, 2003, Enschede, pp. 55-58, retrieved from the Internet: <http://leosbenelux.org/symp03/s03p055.pdf>.

Laroy; "New Concepts of Wavelength Tunable Laser Diodes for Future Telecom Networks"; [dissertation] Universiteit Gent, 2006 [in Dutch and English], 162 pages.

Laroy; "New Widely Tunable Laser Concepts for Future Telecommunication Networks"; FTW-symposium, Belgium, 2002; retrieved from the Internet: <http://photonics.intec.ugent.be/download/pub_1625.pdf>, 2 pages total.

Lumerical Knowledge Base; "Evanescent Waveguide Couplers"; Web. Mar. 6, 2015; <https://kb.lumerical.com/en/pic_passive_waveguide_couplers_evanescent.html>.

Magno, et al.; "Multiphysics Investigation of Thermo-optic Effect in Silicon-on-Insulator Waveguide Arrays" Excerpt from the Proceedings of the COMSOL Users Conference 2006, retrieved from the Internet: <http://cds.comsol.com/access/dl/papers/1628/Magno.pdf>, 6 pages total.

Morthier, et al.; "New Widely Tunable Edge-Emitting Laser Diodes at 1.55 μm Developed in the European IST-project NEWTON"; Semiconductor and Organic Optoelectronic Materials and Devices. Edited by Zah, Chung-En; Luo, Yi; Tsuji, Shinji. Proceedings of the SPIE, 2005; 5624:1-8; retrieved from the Internet: <http://photonics.intec.ugent.be/download/pub_1800.pdf>.

Morthier; "Advanced Widely Tunable Edge-Emitting Laser Diodes and Their Application in Optical Communications"; [presentation], Ghent University—IMEC, 2000, 23 pages total. Can be retrieved from the Internet: <broadband02.ici.ro/program/morthier_3a.ppt>.

Morthier; "New Widely Tunable Lasers for Optical Networks"; NEWTON Project No. IST-2000-28244, Dec. 2001; retrieved from the Internet: <http://www.istoptimist.unibo.it/pdf/network/projects_public/NEWTON/Deliverables/D01.pdf>, 5 pages total.

Park, H., et al., "A Fiber-to-Chip Coupler Based on Si/SiON Cascaded Tapers for Si Photonic Chips" *Optics Express*. vol. 21, No. 24, Dec. 2013, pp. 29313-29319.

Passaro, et al.; "Investigation of Thermo-Optic Effect and Multireflector Tunable Filter/Multiplexer in SOI Waveguides"; Optics Express, May 2, 2005; 13(9):3429-3437.

Wesström, et al.; "Design of a Widely Tunable Modulated Grating Y-branch Laser Using the Additive Vernier Effect for Improved Super-Mode Selection"; IEEE 18th International Semiconductor Laser Conference, 2002, 99-100; retrieved from the Internet: <http://photonics.intec.ugent.be/download/pub_1603.pdf>.

Wesström, et al.; "State-of-the-Art Performance of Widely Tunable Modulated Grating Y-Branch Lasers"; Optical Fiber Communication Conference, Technical Digest (CD) (Optical Society of America, 2004), paper TuE2.

Yamada, K., "Chapter 1: Silicon Photonic Wire Waveguides: Fundamentals and Applications." *Silicon Photonics II*, Topics in Applied Physics 119, 1-29 (2011).

Selected file history U.S. Appl. No. 14/642,429, filed Mar. 9, 2015, all pages.

ISR/WO mailed on Nov. 16, 2012 for International Patent Application No. PCT/US2012/052913 filed on Aug. 29, 2012, all pages.

Written Opinion, dated May 11, 2015, for International Patent Application PCT/US2015/014801 with the International filing date of Feb. 6, 2015, 9 pages.

U.S. Non-Final Office Action dated Sep. 2, 2014 for U.S. Appl. No. 13/597,117, filed Aug. 28, 2012, all pages.

International Search Report and Written Opinion for PCT/US2015/032725 dated Aug. 27, 2015, 11 pages.

ISR/WO mailed on Jan. 22, 2015 for International Patent Application No. PCT/US2014/059900 filed on Oct. 9, 2014, all pages.

International Preliminary Report on Patentability dated Dec. 8, 2016 for International Patent Application No. PCT/US2015/032725, filed May 27, 2015; all pages.

Restriction Requirement dated Dec. 27, 2016 for U.S. Appl. No. 15/051,348, filed Feb. 23, 2016; all pages.

Non-final Office Action dated May 19, 2017 for U.S. Appl. No. 15/051,348, filed Feb. 23, 2016; all pages.

U.S. Appl. No. 15/051,348, filed Feb. 23, 2016 received a Notice of Allowance dated Jan. 19, 2018, 5 pages.

European Supplemental Search Report dated Apr. 9, 2015 for European Patent Application No. 1227040.2-1553, filed Aug. 29, 2012; all pages.

Supplemental Notice of Allowance dated Apr. 24, 2017 for U.S. Appl. No. 14/722,983; all pages.

Non-Final Office Action dated Mar. 7, 2017 for U.S. Appl. No. 15/133,898; all pages.

Notice of Allowance dated Jul. 26, 2017 for U.S. Appl. No. 15/133,898; all pages.

Non-Final Office Action dated Jun. 16, 2017 for U.S. Appl. No. 15/133,920; all pages.

Non-Final Office Action dated Jun. 2, 2017 for U.S. Appl. No. 15/588,128; all pages.

Non-Final Office Action dated Sep. 2, 2014 for U.S. Appl. No. 13/597,117; all pages.

First Action Interview Pilot Program Pre-Interview Communication dated Aug. 25, 2016 for U.S. Appl. No. 14/615,942; all pages.

Notice of Allowance dated Dec. 14, 2016 for U.S. Appl. No. 14/615,942; all pages.

Final Office Action dated Feb. 22, 2016 for U.S. Appl. No. 14/642,429; all pages.

Non-Final Office Action dated Oct. 27, 2015 for U.S. Appl. No. 14/642,429; all pages.

Notice of Allowance dated Jun. 15, 2016 for U.S. Appl. No. 14/642,429; all pages.

Restriction Requirement dated Oct. 3, 2016 for U.S. Appl. No. 14/722,970; all pages.

Non-Final Office Action dated Jan. 26, 2017 for U.S. Appl. No. 14/722,970, filed May 27, 2015: all pages.

U.S. Appl. No. 14/722,970, filed May 27, 2015, received a Notice of Allowance dated Sep. 27, 2017, 6 pages.

Notice of Allowance dated Jan. 18, 2017 for U.S. Appl. No. 14/722,983; all pages.

U.S. Appl. No. 15/487,918, filed Apr. 14, 2017, received a Notice of Allowance, dated Feb. 14, 2018, 8 pages.

Restriction Requirement dated Jul. 22, 2016 for U.S. Appl. No. 14/722,983; all pages.

Supplemental Notice of Allowance dated Feb. 1, 2017 for for U.S. Appl. No. 14/722,983; all pages.

Restriction Requirement dated Oct. 6, 2016 for U.S. Appl. No. 15/133,898; all pages.

Non-Final Office Action dated Oct. 6, 2016 for U.S. Appl. No. 15/133,920; all pages.

Notice of Allowance dated Jan. 25, 2017 for U.S. Appl. No. 15/262,937; all pages.

Notice of Allowance dated Sep. 27, 2017 for U.S. Appl. No. 14/772,970; all pages.

PCT/US2012/052913, "International Preliminary Report on Patentability", dated Mar. 13, 2014, all pages.

PCT/US2015/019430, "International Preliminary Report on Patentability", dated Sep. 22, 2016, all pages.

(56) References Cited

OTHER PUBLICATIONS

PCT/US2015/019430, "International Search Report and Written Opinion", dated May 29, 2015, all pages.
PCT/US2016/028431, "International Search Report and Written Opinion", dated Jul. 28, 2016, all pages.
Non-Final Office Action dated Jun. 3, 2019, for U.S. Appl. No. 16/171,132, 16 pages.
Notice of Allowance dated Jan. 6, 2020 for U.S. Appl. No. 16/171,132, 9 pages.

* cited by examiner

SELF-ALIGNED SPOT SIZE CONVERTER

CROSS-REFERENCES TO RELATED APPLICATIONS

This application claims priority to U.S. Provisional Patent Application No. 62/799,581, filed on Jan. 31, 2019, entitled "SELF-ALIGNED SPOT SIZE CONVERTER," the disclosure of which is hereby incorporated by reference in its entirety for all purposes.

The following are incorporated by reference for all purposes: U.S. patent application Ser. No. 14/615,942, filed on Feb. 6, 2015; U.S. patent application Ser. No. 14/722,970, filed on May 27, 2015; U.S. patent application Ser. No. 14/722,983, filed on May 27, 2015; and U.S. patent application Ser. No. 15/051,348, filed on Feb. 23, 2016. The applications above describe examples of fiber couplers and mode expanders, which, in some embodiments, the ideas in this disclosure could be combined with and/or work as a substitute for.

BACKGROUND

This application relates to optical waveguides. More specifically, and without limitation, the application relates to methods for making a waveguide and a spot size converter (SSC).

Photonic devices, including optical waveguides, are being integrated on semiconductor chips. Photonic devices integrated on semiconductor chips are often designed for use in fiber-optic communication systems.

BRIEF SUMMARY

This application relates to optical waveguides and, more specifically, and without limitation, to methods for making a waveguide and a spot size converter (SSC).

According to some embodiments, a method is provided for forming an optical device having a waveguide and a spot size converter (SSC). The method includes providing a crystalline semiconductor region and a non-crystalline semiconductor region on a substrate. The crystalline semiconductor region is coupled to the non-crystalline semiconductor region. The method also includes simultaneously etching the non-crystalline semiconductor region and the crystalline semiconductor region using a same etch mask to form a portion of a spot size converter coupled to a waveguide. The waveguide has a ridge over a shoulder, and the spot size converter has a ridge over a shoulder.

In some embodiments of the above method, simultaneously etching the non-crystalline semiconductor region and the crystalline semiconductor region includes simultaneously etching the non-crystalline semiconductor region and the crystalline semiconductor region using a same etch mask to simultaneously form the ridge of the waveguide and the first stage of the ridge portion of the SSC. Similarly, in some embodiments, simultaneously etching the non-crystalline semiconductor region and the crystalline semiconductor region includes simultaneously etching the non-crystalline semiconductor region and the crystalline semiconductor region using a same etch mask to simultaneously form the shoulder of the waveguide and the shoulder of the portion of the SSC.

In some embodiments of the above method, simultaneously etching the non-crystalline semiconductor region and the crystalline semiconductor region includes simultaneously etching to remove a portion of the non-crystalline semiconductor region and a portion of the crystalline semiconductor region using a first mask to form the shoulder of the waveguide and the shoulder of the SSC simultaneously; and then, simultaneously etching a top portion of the non-crystalline semiconductor region and a top portion of the crystalline semiconductor region using a second mask to simultaneously form the ridge of the waveguide and the first stage of the ridge of the SSC.

In some embodiments, the method also includes testing the waveguide and the SSC by applying a light beam into the waveguide and measuring an output light at an output end of the SSC.

In some embodiments, providing a crystalline semiconductor region and a non-crystalline semiconductor region on the substrate includes providing a substrate having a crystalline device layer disposed on the substrate, applying a mask layer on the crystalline device layer, and etching the crystalline device layer to form a first recess. The first recess has a shape of a first pattern, and a remaining portion of the crystalline device layer forms the crystalline semiconductor region. The method also includes removing photoresist from the crystalline device layer, and filling the first recess with a non-crystalline semiconductor material to form the non-crystalline semiconductor region.

In some embodiments, the method also includes forming a second stage of the ridge on the first stage, forming a third stage of the ridge on the second stage, and testing the waveguide and the SSC by shining light into the waveguide and measuring output optical signal at an output end of the SSC.

In some embodiments, the method also includes forming a fourth stage of the ridge on the third stage, and testing the waveguide and the SSC by shining light into the waveguide and measuring an output optical signal at an output end of the SSC.

According to some embodiments, an optical device includes a substrate, a waveguide disposed on the substrate, and a spot size converter (SSC) disposed on the substrate. The SSC is coupled to the waveguide. The waveguide has a shoulder and a ridge located over the shoulder, and the SSC includes a shoulder and a ridge located over the shoulder. The ridge of the waveguide is aligned to the ridge of the SSC.

In some embodiments of the above optical device, the waveguide is made of a first material, and the SSC is made of a second material, the second material being different from the first material. The shoulder of the waveguide and the shoulder of the SSC have a first common width, and the ridge of the waveguide and the first stage of the ridge of the SSC have a second common width. Further, the shoulder of the waveguide and the shoulder of the SSC have a first common height, and the ridge of the waveguide and the first stage of the ridge of the SSC have a second common height.

In some embodiments, the ridge of the SSC further includes a second stage overlying the first stage. Both the first stage and the second stage are configured to taper and widen from an input end to an output end, the first stage has a maximum width, the second stage has a maximum width, and the maximum width of the first stage is greater than the maximum width of the second stage.

In some embodiments, the first material comprises crystalline silicon and the second material comprises amorphous silicon. In some embodiments, the ridge of the SSC can include multiple stages located above the first stage.

Further areas of applicability of the present disclosure will become apparent from the detailed description provided hereinafter. It should be understood that the detailed descrip-

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DESCRIPTION

This application discloses embodiments of a mode expander (a spot size converter, SSC) for coupling a smaller optical mode, such as a fundamental mode in a semiconductor waveguide, to a larger optical mode, such as a fundamental mode in an optical fiber (e.g., one or more SSCs to couple one or more waveguides of an optical transceiver to one or more optical fibers in a quad small form-factor pluggable (QSFP) module).

Figure 1:
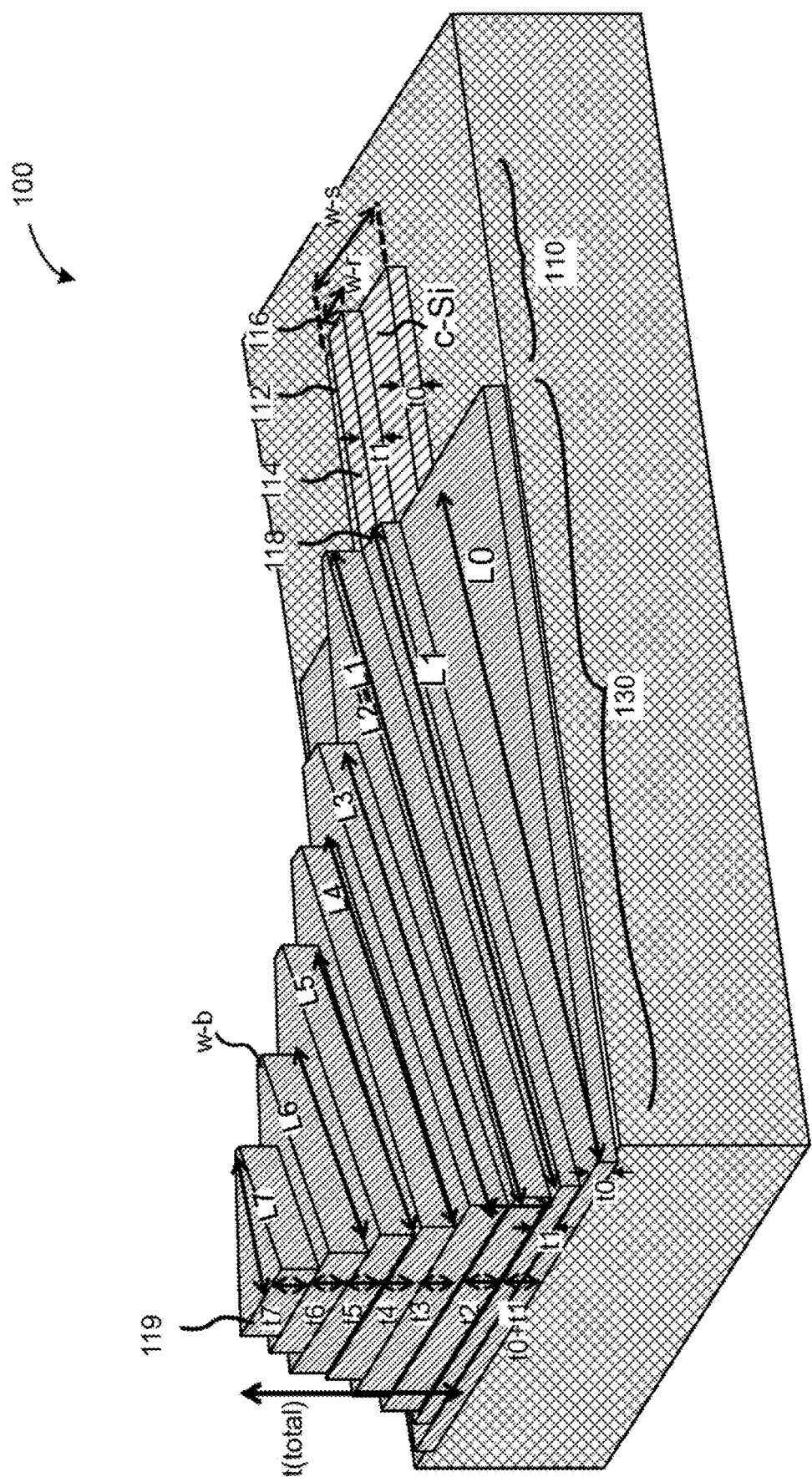
FIG. 1 is a perspective view diagram illustrating an optical device including a waveguide and a spot size converter according to some embodiments of the present invention.
Figure 2:
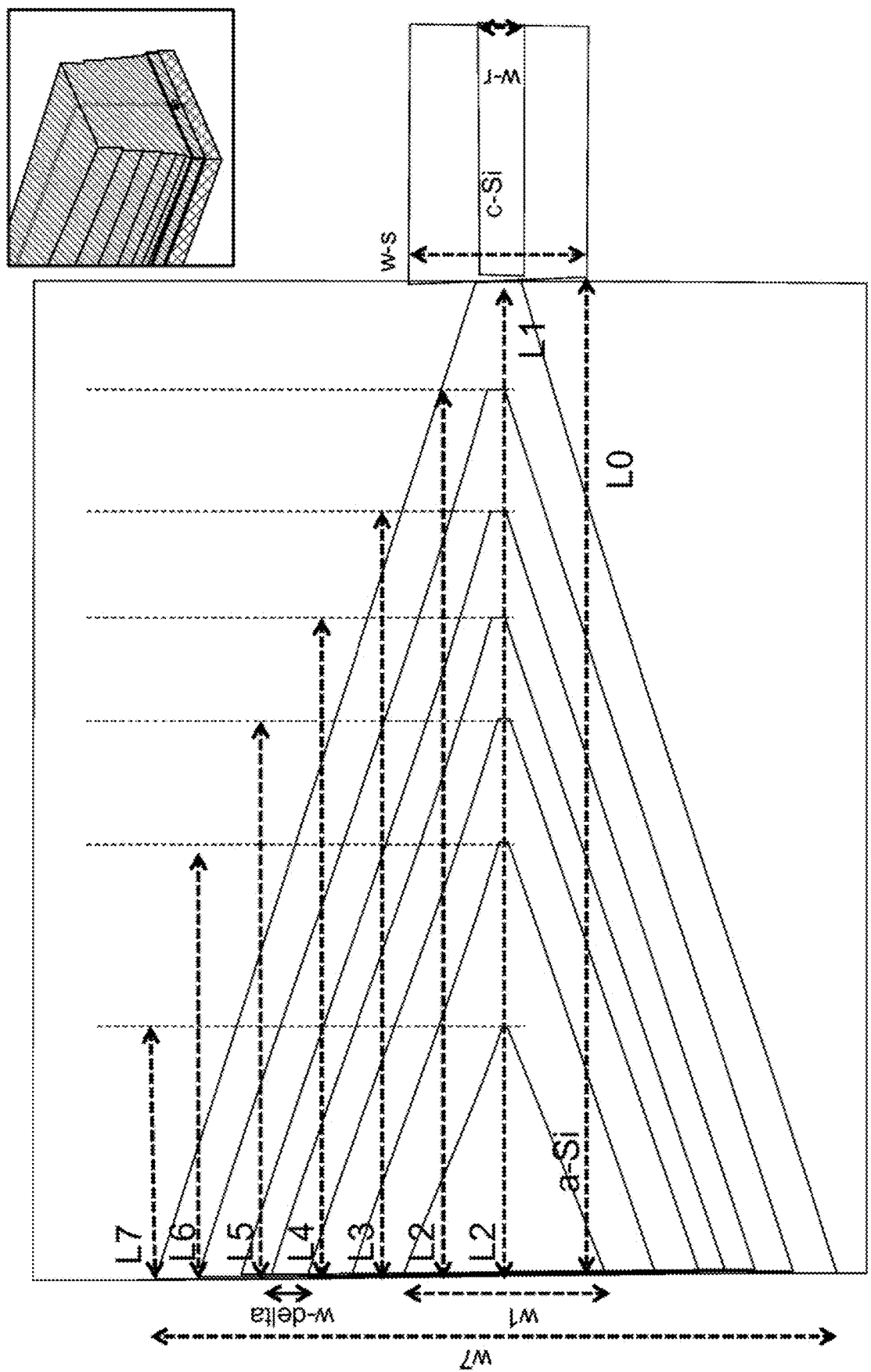
FIG. 2 is a top view diagram illustrating the optical device of FIG. 1 according to some embodiments of the present invention.

FIG. 1 is a perspective view diagram illustrating an optical device including a waveguide and a spot size converter (SSC), and FIG. 2 is a top view diagram illustrating the optical device of FIG. 1 according to some embodiments of the present invention. In FIG. 1, an optical device 100 includes a waveguide 110 and an optical spot size converter (SSC) 130. The waveguide 110 is crystalline silicon. The waveguide 110 comprises a ridge 112 and a shoulder 114. The ridge has a thickness t1 and a width w-r. The shoulder has a thickness t0 and a width w-s. The waveguide 110 has an input end 116 and an output end 118. The SSC 130 has an input end at 118 and an output end at 119.

The spot size converter (SSC) comprises multiple stages of non-crystalline silicon, for example, amorphous silicon (a-Si). In this disclosure non-crystalline silicon can include amorphous silicon (a-Si) and polycrystalline silicon. The spot size converter comprises a shoulder and seven stages. In some embodiments, more or fewer than seven stages are used. Each stage has a beginning width, w-b, which is the most narrow part of the stage. In some embodiments one or more stages have different beginning widths, w-b.

In the SSC, the shoulder has a thickness t0. Each stage has a thickness, e.g., measured in a direction normal to a surface of a substrate that the spot size converter is on. The first stage has a first thickness, t1; the second stage has a second thickness, t2, and so on to the n-th stage. There is a total thickness, t(total), which is equal to the sum of the thickness of each stage. Each stage has a length. The length of the first stage is L1, the length of the second stage is L2, and so on to the n-th stage. In the embodiment shown, n=7. In some embodiments, a 1-stage SSC can include the shoulder and the first stage of SSC 130. As described below, the same etching process is used to form the waveguide and the 1-stage SSC that includes the first stage and the shoulder of the SSC 130.

The shoulder of the SSC has a length L0. In some embodiments, the shoulder of the SSC and the shoulder of the waveguide have substantially the same thickness, and the first stage of the SSC and the ridge of the waveguide have substantially the same thickness.

The following table lists some example ranges and values for various dimensions.

| Dimension | Example Ranges (µm) | Example Values (µm) |
| --- | --- | --- |
| L1 | 200-1200 | 930, 1000, 1100, 1200 |
| L2 | 200-1400 | 930, 1000, 1100, 1200 |
| L3 | 200-1080 | 917, 925, 933 |
| L4 | 100-975 | 782, 800, 833 |

-continued

| Dimension | Example Ranges (μm) | Example Values (μm) |
|---|---|---|
| L5 | 100-880 | 708, 725, 728 |
| L6 | 100-790 | 484, 500, 521 |
| L7 | 50-710 | 300, 333, 350 |
| t1 | 0.75-2.25 | 1.0, 1.5, 1.75 |
| t2 | 0.3-1.5 | 0.6, 0.7, 0.8 |
| t3 | 0.5-2.2 | 1.0, 1.1, 1.2 |
| t4 | 0.9-3.6 | 1.5, 1.6, 1.8 |
| t5 | 1.1-3.8 | 2.0, 2.1, 2.2 |
| t6 | 1.3-4.3 | 2.3, 2.5, 2.6 |
| t7 | 1.5-4.6 | 2.8, 2.9, 3.0 |
| t(s0-s4) | 2.0-6.5 | 3.0, 3.9, 4.4, 4.9, 5.8, 6 |
| t(s5-s7) | 3.0-9.5 | 5.0, 6.0, 6.5, 7.6, 8.9 |
| t(total) | 8-17 | 12, 12.5, 12.9 |
| w-r | 0.75-3.5, 1.2-2.0 | 1.3, 1.5, 1.75, 2.0 |
| w-s | 0.75-4.5 | 2.5, 3, 3.5 |
| w1 | 8-15 | 11.5, 11.7, 12, 12.7 |
| w7 | 9-20 | 12, 14.1, 14.3, 15 |
| w-delta | 0.1-0.5 | 0.2, 0.3, 0.4 |
| w-b | 0.0-1.0 | 0.3, 0.4, 0.5, 0.9 |

Stage 1 thickness, t1, is equal to a thickness of the ridge of the waveguide. From stage 2, thicknesses of subsequent stages (higher-numbered stages) can be thicker than preceding stages (lower-numbered stages). In some embodiments, the lengths of stages are 50%-90% of the stage below (e.g., directly below).

In some embodiments, a number of stages other than seven for the mode converter are used. Though performance is increased with a higher number of stages, complexity and difficulty in fabricating also increase.

In some embodiments, one or more stages of the ridge include tapers. For example, the first stage of the ridge portion of the SSC is configured to taper from a tip at an input end, which is coupled to the ridge of the waveguide, to an expanded width at an output end for coupling to an optical fiber. The beginning width of tapers (w-b) ("tips") may be narrower than 300 nm. In some embodiments, 300 nm is a dimension of a photolithography lens used to fabricate the device, but tips can be much narrower (e.g., 10 nm). Also, edges of tapers may not be as sharp as shown, but instead are somewhat rounded, resulting in a design closer to a vertical taper than what is depicted in the figures.

Figure 3:
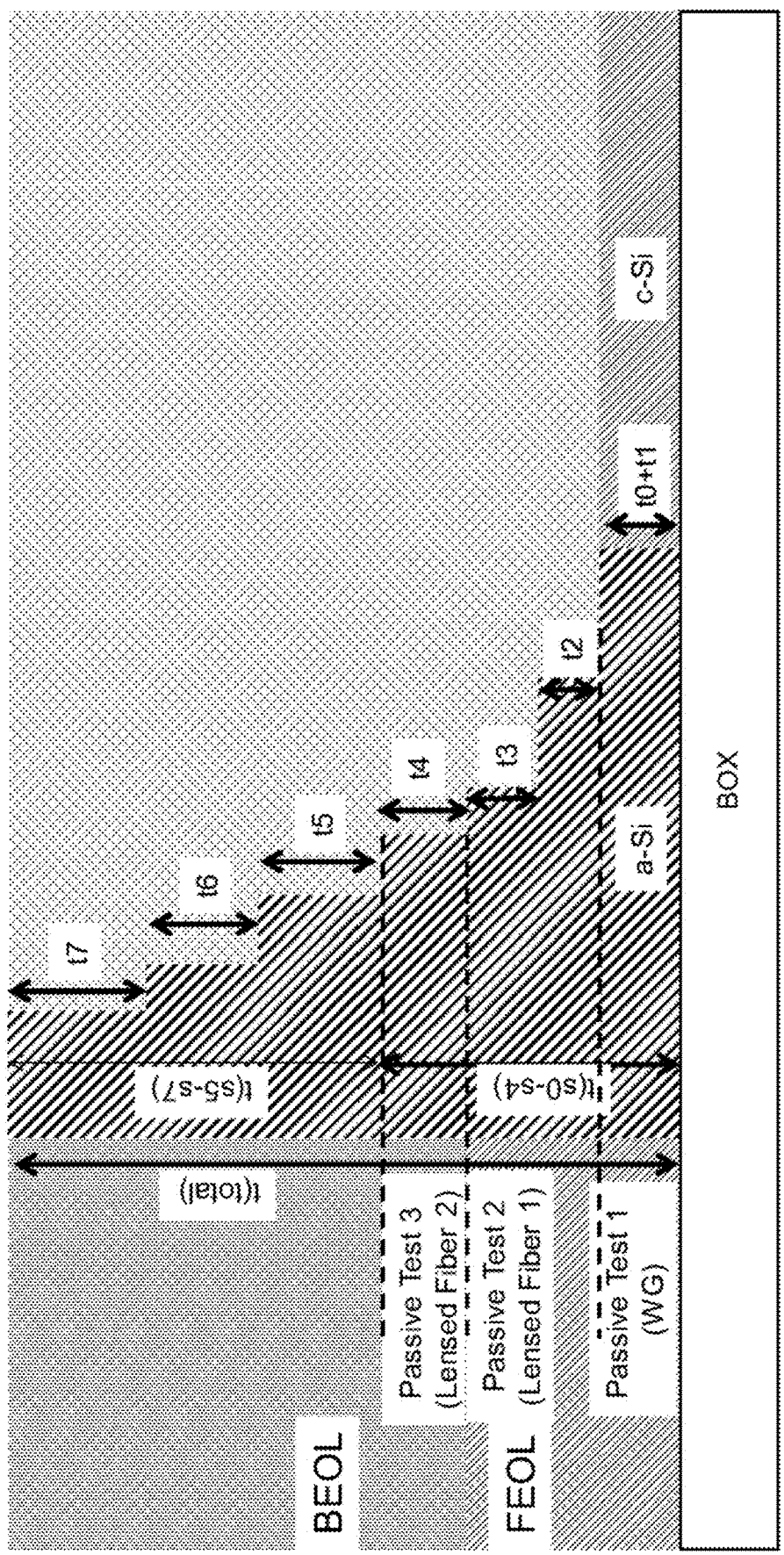
FIG. 3 is a longitudinal cross-sectional view diagram illustrating the optical device of FIGS. 1 and 2 according to some embodiments of the present invention.

FIG. 3 is a longitudinal cross-sectional view diagram illustrating the waveguide and the spot size converter in FIGS. 1 and 2 according to some embodiments of the present invention. The left side of the diagram indicates that certain stages can be formed in a front end of the line (FEOL) process or a back end of the line (BEOL) process. In some embodiments, the FEOL process can include the fabrication of waveguides and other passive optical elements. A middle of the line (MOL) process can include the integration of III-V optical chips such as lasers, etc. The BEOL process can include the formation of metal wirings, etc. In FIG. 3, the waveguide, the shoulder of the SSC, and stages 1-3 of the SSC are formed during a front end of the line (FEOL) process. In some embodiments, these elements can be formed using existing processing steps in the FEOL process. The stages 4-7 are formed during a back end of the line (FEOL) process, and the device parameters are selected to be compatible with the existing BEOL process.

In some embodiments, the shoulder and ridge of the waveguide and the shoulder can be formed simultaneously using the same etch process. Similarly, the ridge of the waveguide and the ridge of the first stage of the SSC can be formed simultaneously using the same etch process. This process allows portions of the SSC to be formed early in the process flow, and enables the shoulder and stages 1-3 to be formed in the FEOL process. Embodiments of the method described here can offer many advantages over conventional processes. In a conventional fabrication process, the waveguide is usually formed in the front end of the process, and the SSC is formed in a back end of the process. In this case, alignment errors between the SSC and waveguide are often unavoidable, causing loss of efficiency. In embodiments of the invention, the shoulder of the waveguide and the shoulder of the SSC can be simultaneous formed in one simultaneous etching step, and the ridge of the waveguide and the first stage of the SSC can be formed simultaneously in another step. As a result, the alignment errors between the SSC and the waveguide can be reduced or eliminated.

Another advantage provided by embodiments of the invention is that, by forming the SSC along with the waveguide in the early part of the process flow, testing and detection of defects can be carried out early in the manufacturing process. The testing can include testing the waveguide and the SSC by shining light into the waveguide and measuring an output optical signal at an output end of the SSC. As shown in FIG. 3, a first passive test, Passive Test 1, can be carried out after the waveguide and the shoulder and ridge of the first stage of the SSC are formed. In this test, a light beam can be applied to the input end of the waveguide, and the output light can be detected at the output end of the SSC, for example, by an external waveguide, WG. This test can help to determine the functionality and alignment of the SSC and waveguide early in the process flow. Similarly, a second passive test, Passive Test 2, can be carried out after stages 2 and 3 of the SSC are formed, for example, by using a first lensed fiber, Lensed Fiber 1, at the output end of the SSC to detect light applied to the waveguide. The first lensed fiber can have a diameter of, e.g., 1.5-5.0 μm, or a diameter that matches the thickness of the SSC including the shoulder and stages 1-4. Further, a third passive test, Passive Test 3, can be carried out after stage 4 of the ridge is formed, for example, by using a second lensed fiber, Lensed Fiber 2, at the output end of the SSC to detect light applied to the waveguide. The second lensed fiber can have a diameter of, e.g., 2.0-6.0 μm, or a diameter that matches the thickness of the SSC including the shoulder and stages 1-4, t(s0-s4). The early testing can lead to early detection of defects and allow early corrective actions. Subsequently, stages 5-7 can be formed, as described below in connection with FIGS. 6-14.

Figure 4:
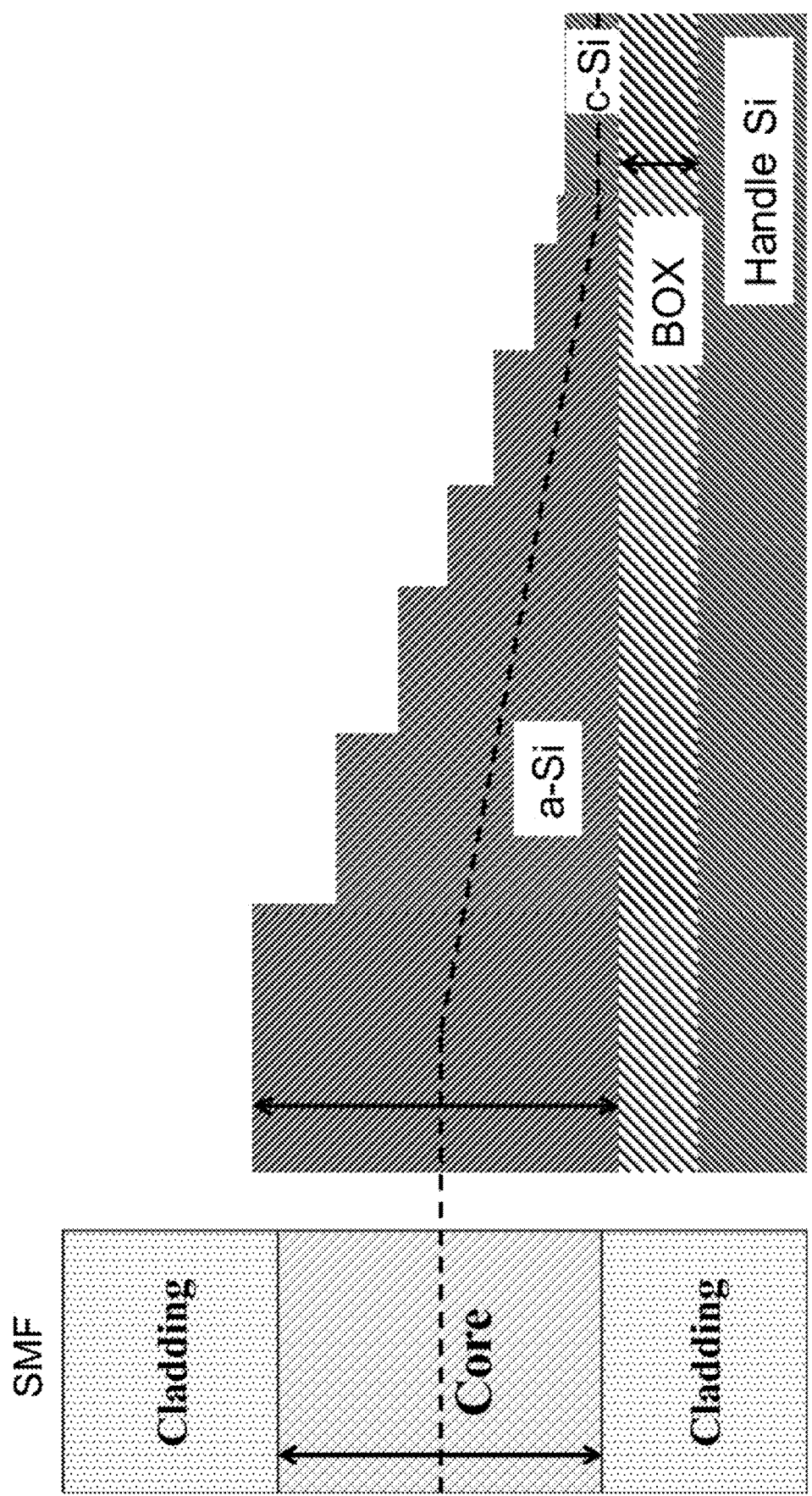
FIG. 4 is a longitudinal cross-sectional view diagram illustrating the optical device coupled to an optical fiber according to some embodiments of the present invention.

FIG. 4 is a longitudinal cross-sectional view diagram illustrating the optical device of FIG. 1 coupled to an optical fiber according to some embodiments of the present invention. FIG. 4 shows a side view of a waveguide and a spot size converter (SSC) optically coupled (e.g., butt coupled) to an optical fiber. The waveguide and the SSC are integrated on an $SiO_2$ layer, BOX, on a handle substrate, Handle Si, in a silicon-on-insulator (SOI) wafer. The optical fiber, in this case a single mode fiber, SMF, includes cladding regions surrounding a core region 204. The SSC and optical fiber are well matched so that a lens is not used to couple light from the SSC to the optical fiber.

Figure 5:
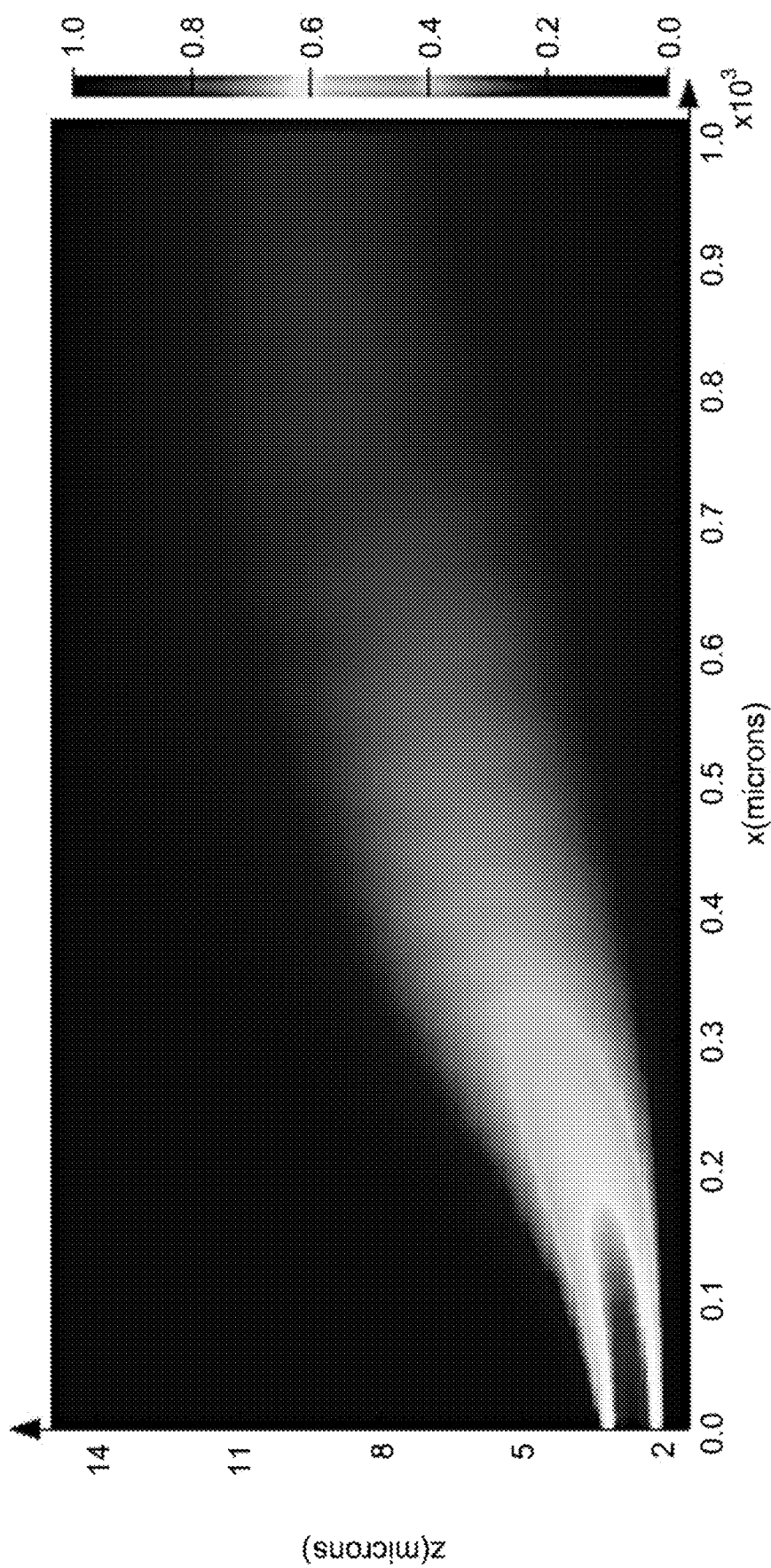
FIG. 5 is a graph illustrating simulated optical signal strength along the longitudinal cross section of the optical device of FIG. 1 according to some embodiments of the present invention.

FIG. 5 is a diagram illustrating simulated optical signal strength along the longitudinal cross section of SSC in the optical device of FIG. 1 according to some embodiments of the present invention. In FIG. 5, a simulated profile of a beam signal strength is shown, with a colored bar on the right indicating optical signal strength represented by each color. It can be seen that the small spot size of the beam with high intensity, at the input end on the left hand side, is expanded as it is transmitted along the longitudinal direction through the spot size converter. As the spot size of the beam is expanded, the signal strength density is reduced.

FIGS. 6-15 are cross-sectional and perspective view diagrams illustrating a method for making spot size converter and a waveguide according to some embodiments of the present invention.

Figure 6:
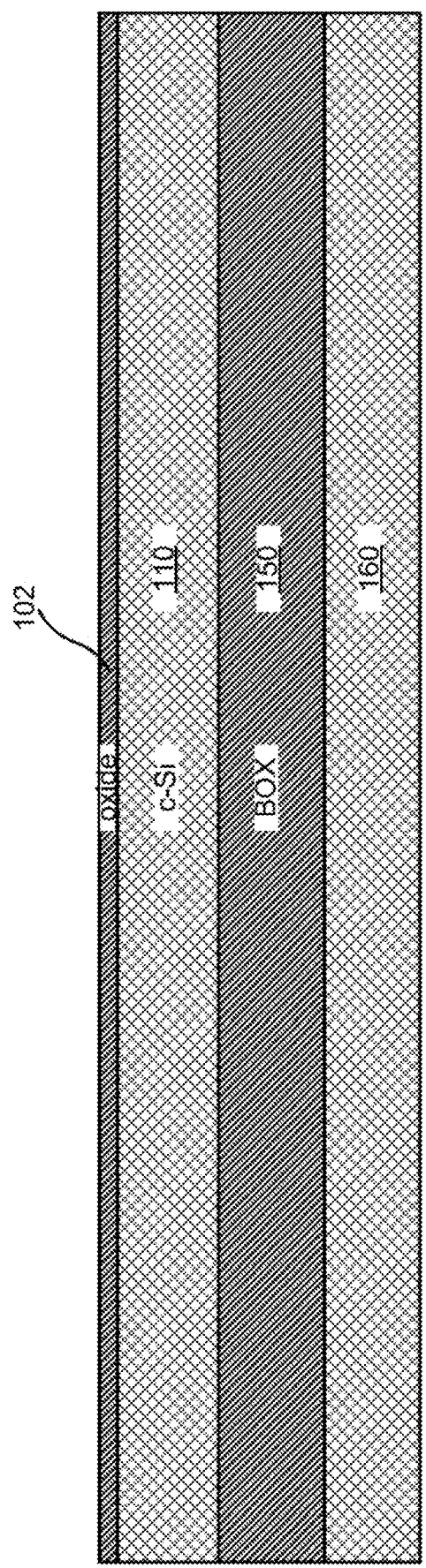
FIGS. 6-15 are cross-sectional and perspective view diagrams illustrating a method for making the optical device according to some embodiments of the present invention.

In FIG. 6, a crystalline device layer, for example, a crystalline silicon layer (cSi) 110, is disposed on a substrate including a buried oxide layer (BOX) 150 on a handler substrate 160. In some embodiments, this device structure may be provided by a silicon-on-insulator (SOI) wafer. In FIG. 6, an oxide layer 102 is formed on a crystalline silicon layer (cSi) 110. Depending on the embodiments, the oxide layer can have a thickness in the range of 100-350 nm.

Figure 7:
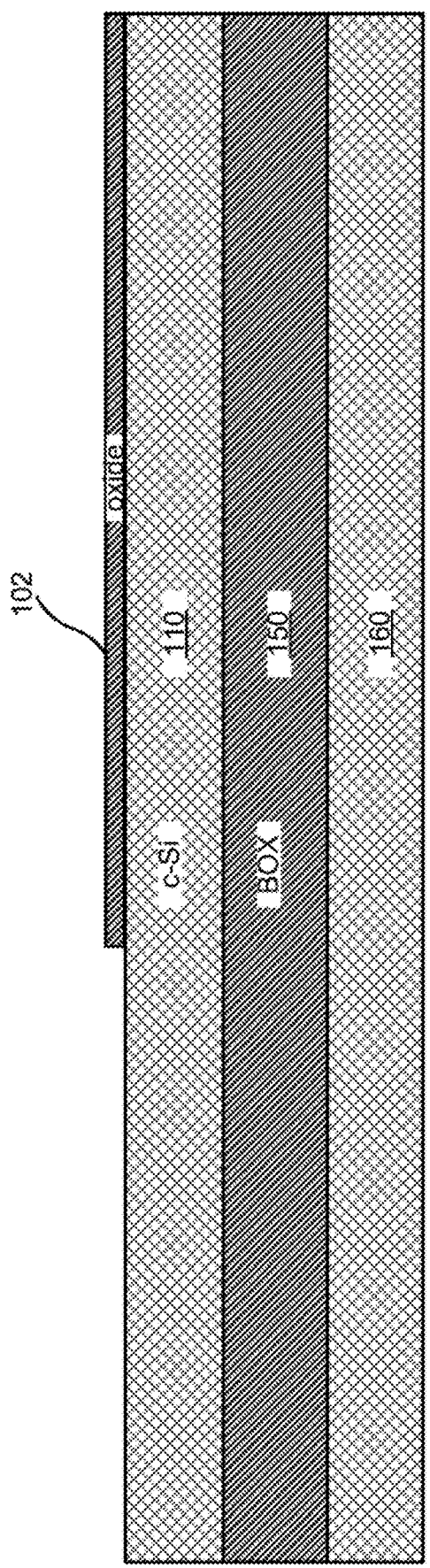

In FIG. 7, a portion of the oxide layer 102 is removed in preparation for the formation of an amorphous silicon region. Here, the oxide layer 102 is used as mask layer, which can be patterned using a photoresist in a lithography process.

Figure 8:
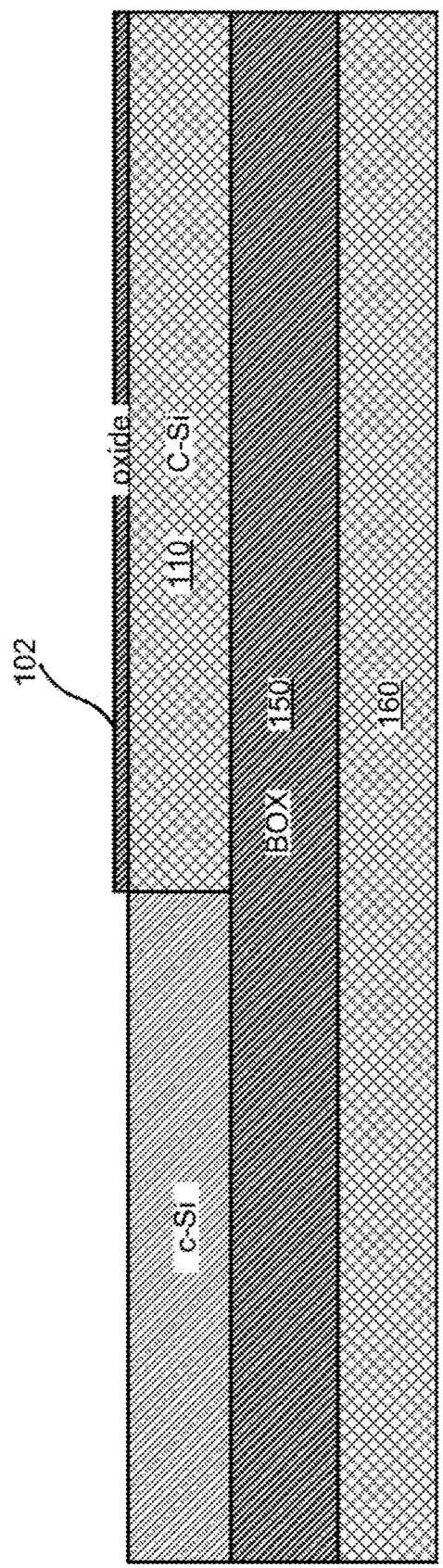

In FIG. 8, the portion of the crystalline silicon layer (cSi) 110 not protected by the oxide layer 102 is removed by an etching process to form a recess. Next, the recess is filled with a non-crystalline layer of material and then planarized. In this example, the non-crystalline layer is an amorphous silicon layer (a-Si). In alternative embodiments, the non-crystalline layer can be made of polysilicon. A more detailed description of this process can be found in U.S. patent application Ser. No. 14/615,942, filed on Feb. 6, 2015, incorporated herein by reference for all purposes.

Figure 9:
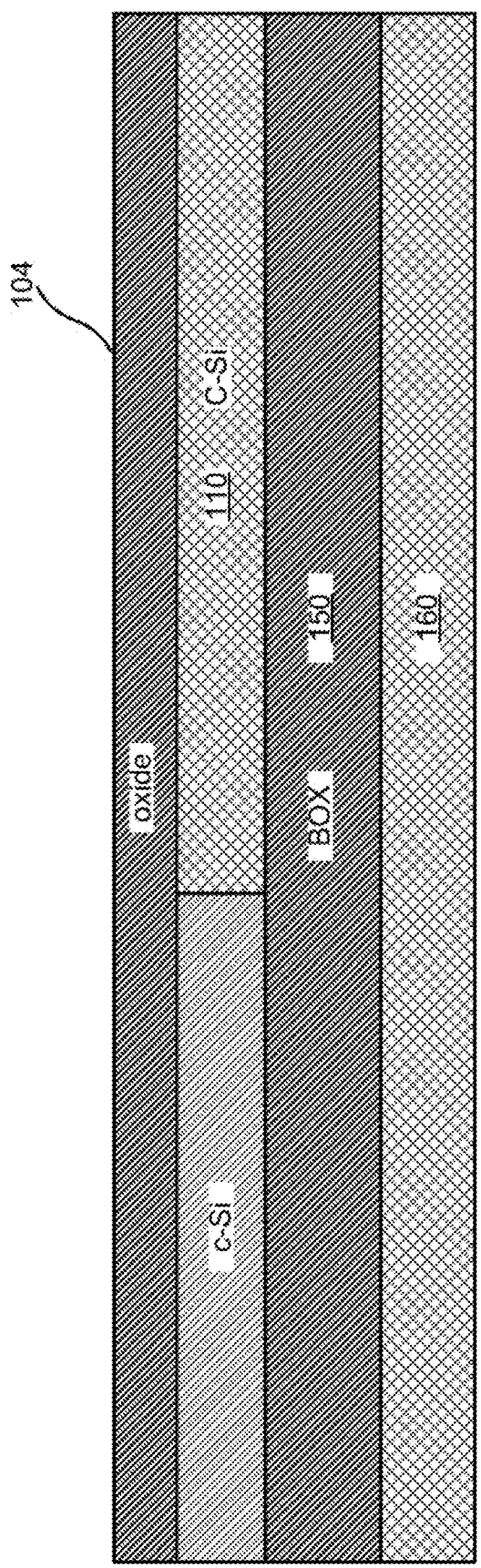

In FIG. 9, the remaining portion of oxide layer 102 is removed, and a hard mask layer 104 is deposited. The hard mask can be made of a material suitable for an etch mask, for example, silicon oxide, silicon nitride, etc. At this point, the hard mask can be patterned and used to carry out an etching process to simultaneously etch the non-crystalline silicon layer and the crystalline silicon layer.

Figure 10:
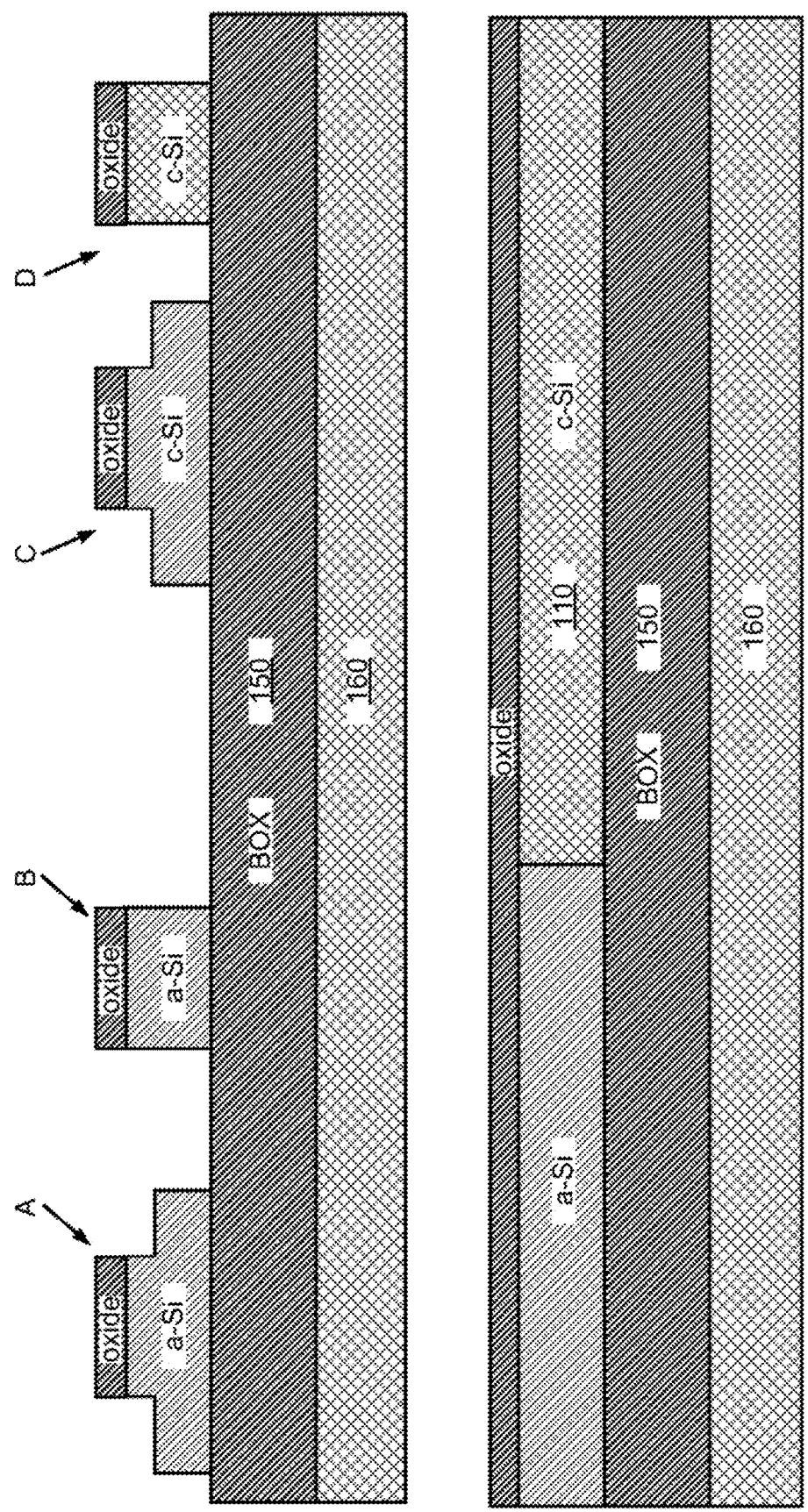

FIG. 10 shows examples of structures that can be formed using a simultaneous etching process. The lower diagram in FIG. 10 shows a cross sectional view along the length of the device structure of FIG. 9. The upper diagram in FIG. 10 shows cross sectional views of several possible device structures across the device structure of FIG. 9 in a perpendicular direction. For example, structure B in the amorphous region and structure D in the crystalline silicon region can be made simultaneously using a single etching step. Structure A in the amorphous region and structure C in the crystalline silicon region can be made simultaneously in a two-step etching process. Alternatively, structure A in the amorphous region and structure C in the crystalline silicon region can be made simultaneously in a single etching process, if the lower half of the structures have already been formed separately.

Figure 11:
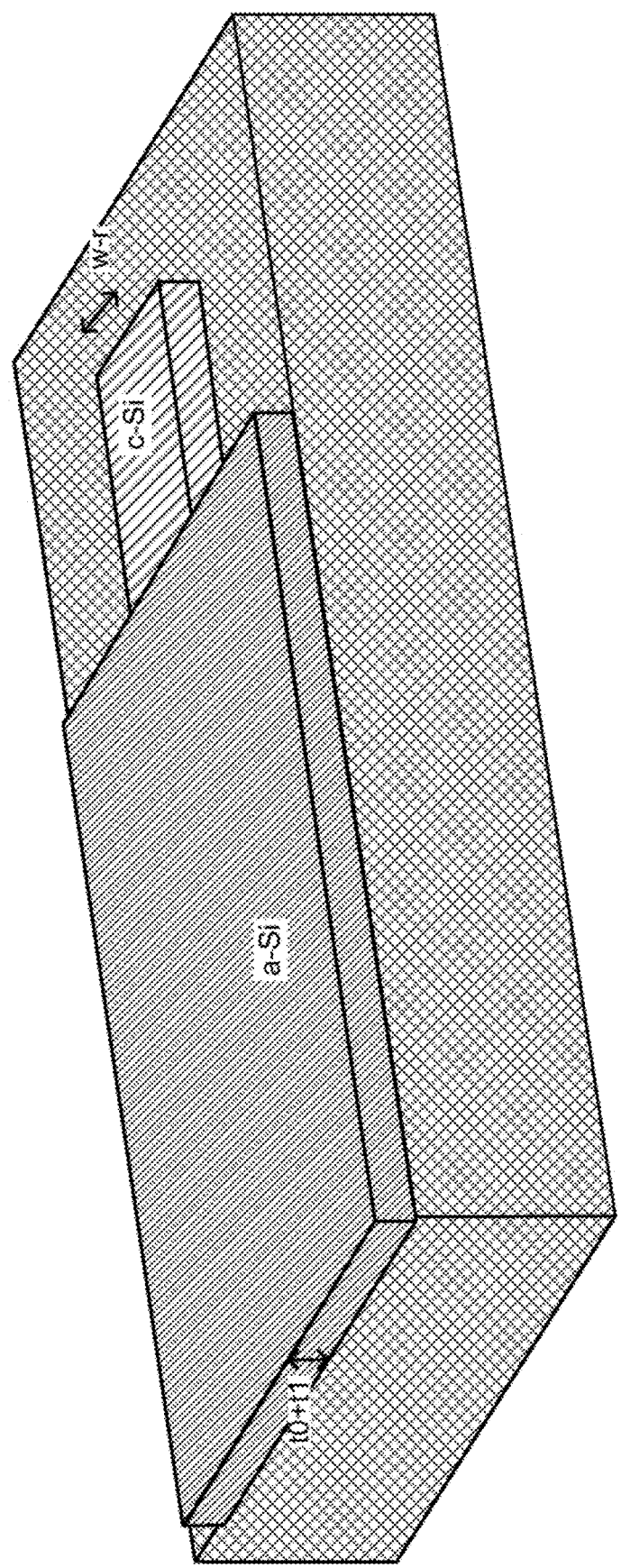
Figure 12:
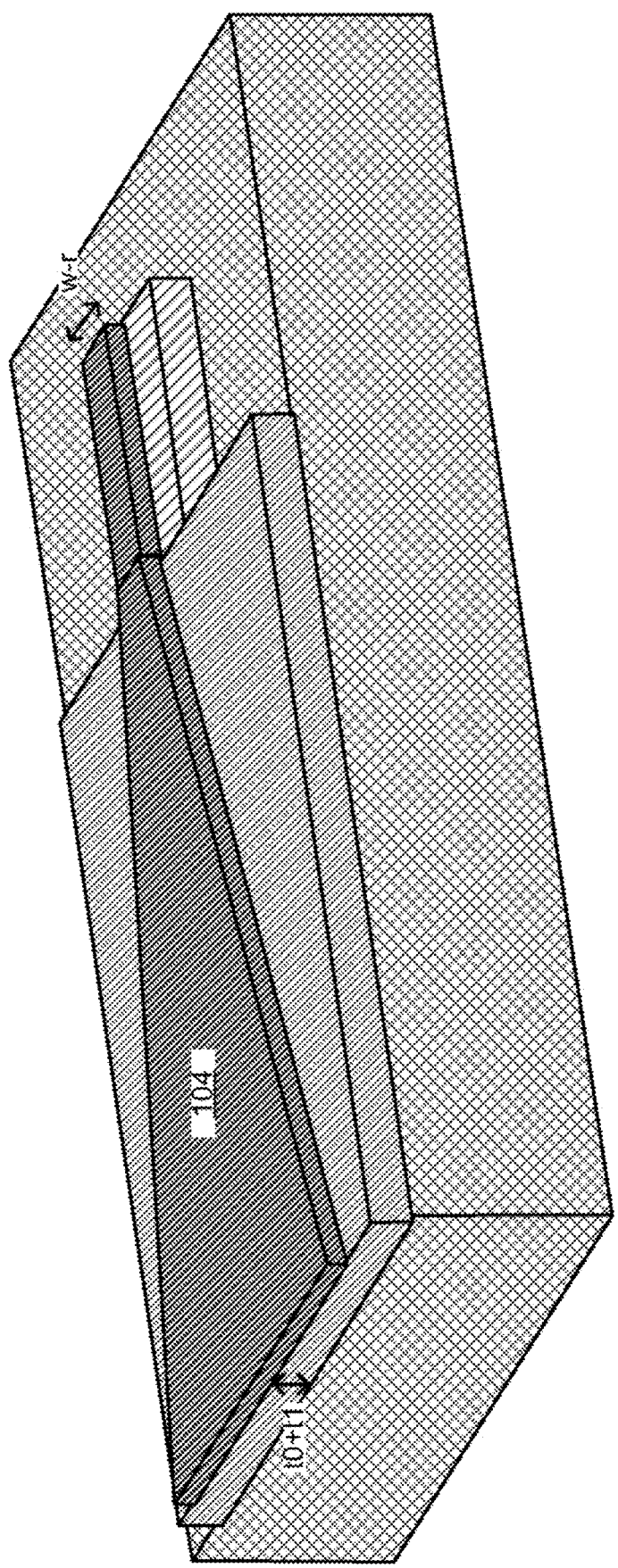
Figure 13:
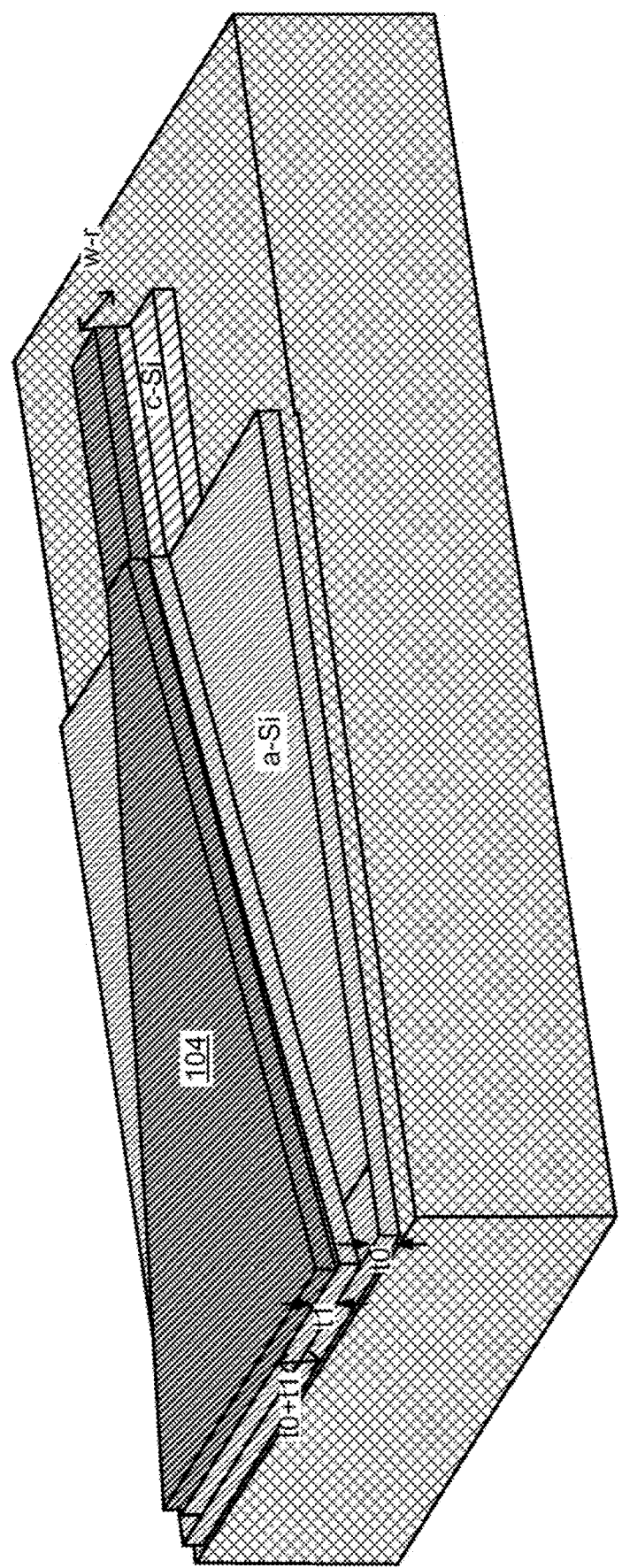

FIGS. 11-13 illustrate a method for forming a waveguide and an SSC using a simultaneous etching process described above.

FIG. 11 is a perspective view diagram illustrating a structure, in which an amorphous silicon region and a crystalline silicon region have been formed on a substrate, corresponding to the structure in FIG. 8 with the oxide layer removed. As shown below, a shoulder of thickness t0 and a ridge of thickness t1 will be formed in the amorphous silicon region and the crystalline silicon region, which has a total thickness of t0+t1.

FIG. 12 is a perspective view diagram illustrating a structure, in which a hard mask layer 104 is deposited and patterned on the amorphous silicon region and the crystalline silicon region, corresponding to the structure in FIG. 9 with the hard mask having been patterned.

FIG. 13 is a perspective view diagram illustrating a structure, in which an amorphous silicon region and a crystalline silicon region have been etched using the hard mask 104 and a simultaneous etching process corresponding to an etched structure in FIG. 10. The etch process removed top portions of the amorphous silicon region and crystalline silicon region to form a shoulder of thickness t0 and a ridge of thickness t1.

Figure 14:
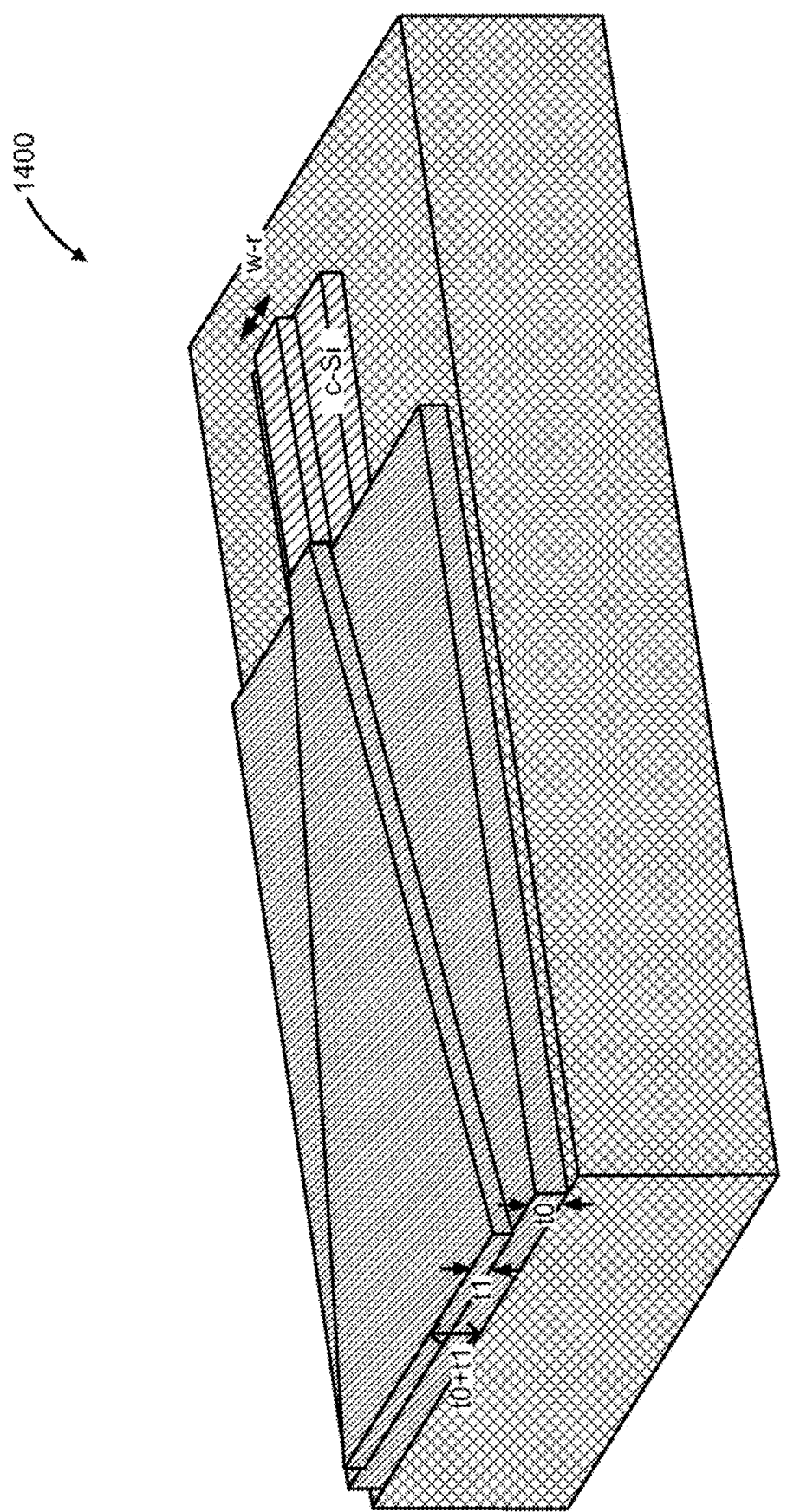

FIG. 14 is a perspective view diagram illustrating a structure, in which the hard mask has been removed from the structure in FIG. 13, corresponding to the structures A and C in FIG. 10 without the etch mask. It can be seen that ridges and shoulders are formed in both the amorphous silicon region and the crystalline silicon region. In this etching process, the top portions of both the amorphous silicon region and the crystalline silicon region not protected by the patterned hard mask are removed to form a ridge. The depth of the etch can be controlled by end-point detection or by a timed etching process. The shoulders of the crystalline Si waveguide and the SSC can be formed simultaneously in a similar manner by a single etch process.

In embodiments of the invention, the self-aligned method of forming the first stage of the SSC and the waveguide simultaneously using the same etching processes can avoid alignment errors. Further, by forming the SSC along with the waveguide in an early part of the process flow, testing and detection of defects can be carried out early in the process to avoid costly mistakes further into the manufacturing process.

Figure 15:
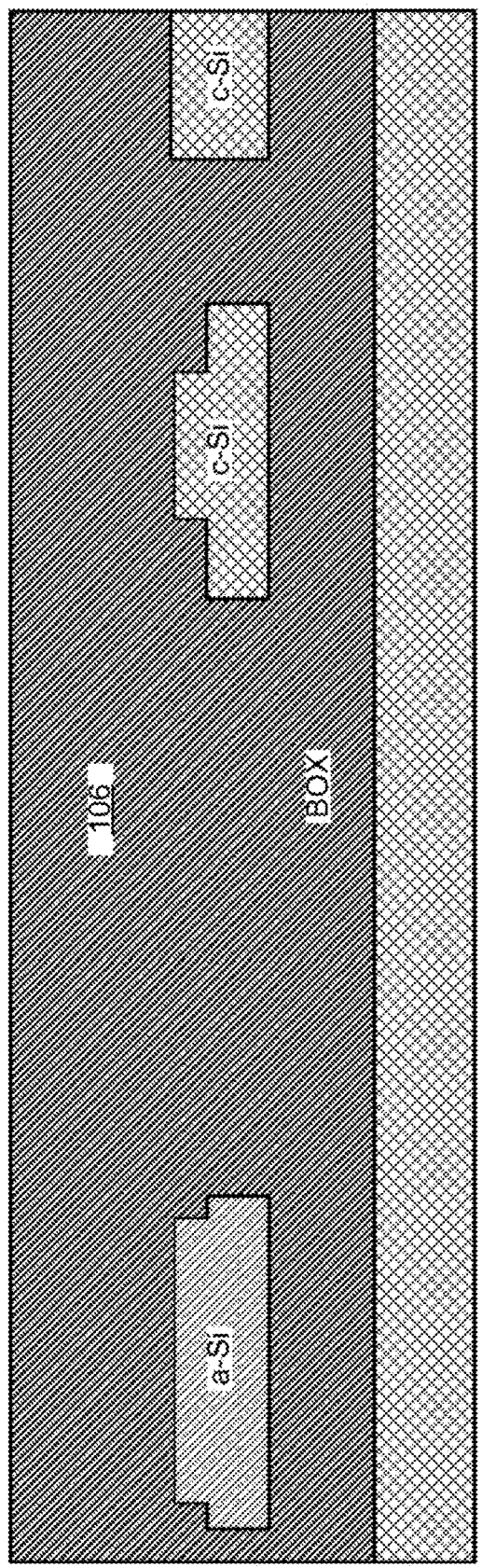

In FIG. 15, a dielectric layer 106 is deposited on the device structures in FIGS. 10 and 14. The dielectric layer is then planarized, e.g., using a CMP process. At this point, additional stages of the SSC can be formed, as described in the examples below.

Figure 16:
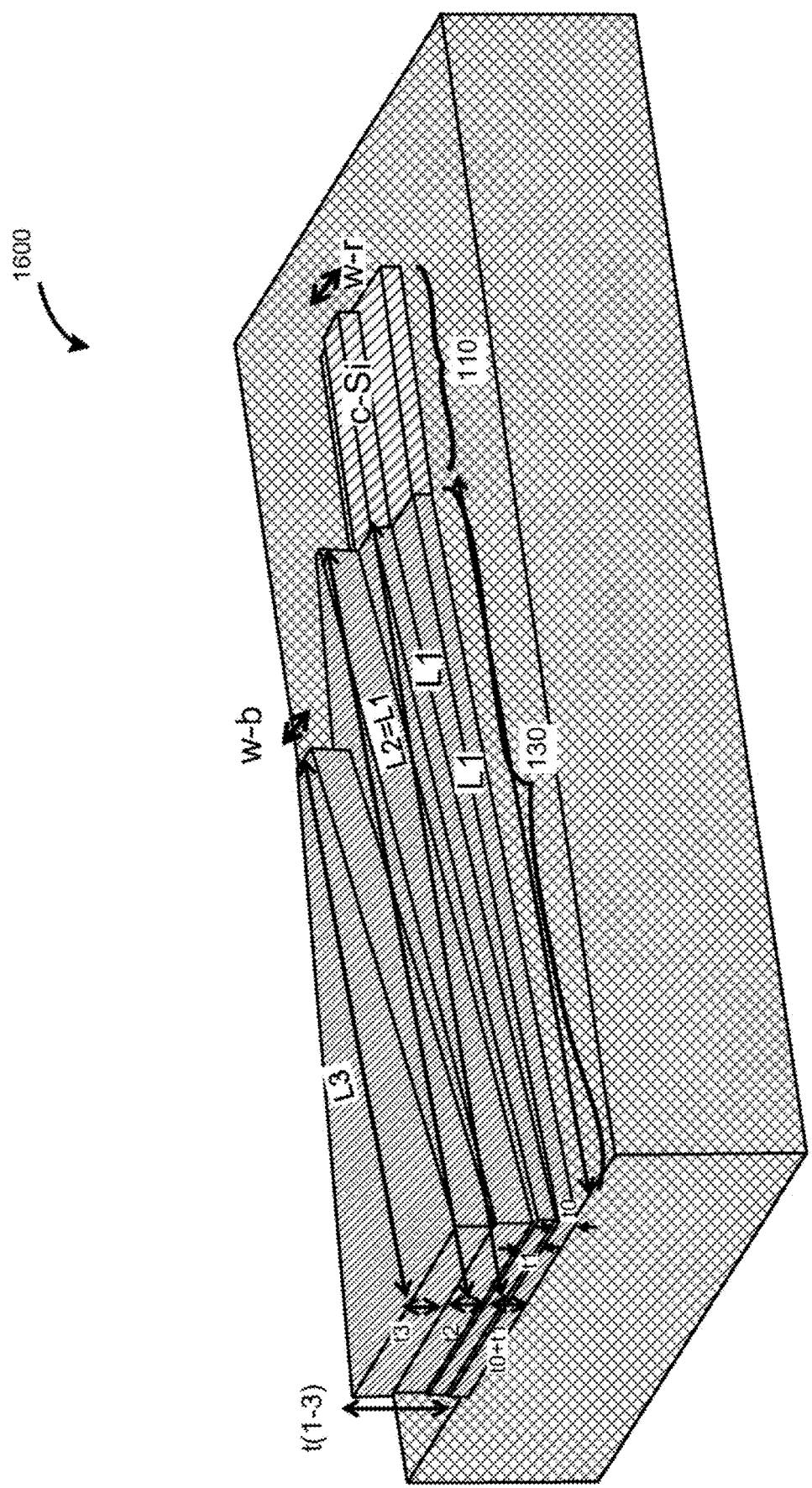
FIG. 16 is a perspective view diagram illustrating an optical device including a 3-stage spot size converter according to some embodiments of the present invention.

FIG. 16 is a perspective view diagram illustrating a spot size converter according to some embodiments of the present invention. As shown in FIG. 16, optical device 1600 includes a waveguide and spot size converter (SSC) integrated on a substrate. The shoulder in the waveguide has thickness of t0, and the ridge of the waveguide has a thickness of t1. The shoulder in the SSC has a thickness t0, and the first stage of the SSC has a thickness t1. Similar to device 1400, the ridge of the waveguide and the first stage of the SSC in FIG. 16 can be formed using a self-aligned process described above as can be the shoulder of the waveguide and the shoulder of the SSC. Unlike the device in FIG. 1400, in FIG. 16, the shoulder of the SSC has an initial width at the input end that matches the width of the shoulder of the waveguide, and the shoulder of the SSC tapers and expands to a wider dimension at the output end. Two more stages are formed over the first stage of the SSC. A second stage has a length of L2 and a thickness of t2, and a third stage has a length of L3 and a thickness t3. The two additional stages both taper to greater widths at the output end. These two additional stages can be formed by forming a patterned recess in the dielectric layer covering the first stage of the SSC and the waveguide. The patterned recess can be filled with non-crystalline silicon and then planarized, resulting in a new stage of the SSC. Further details of this and other methods can be found in U.S. application Ser. No. 14/615,942, filed on Feb. 6, 2015, incorporated by reference in its entirety for all purpose. Optical device 1600 shown in FIG. 16 can be tested by coupling to a lensed fiber in passive test 2 as described above in connection to FIG. 3.

Figure 17:
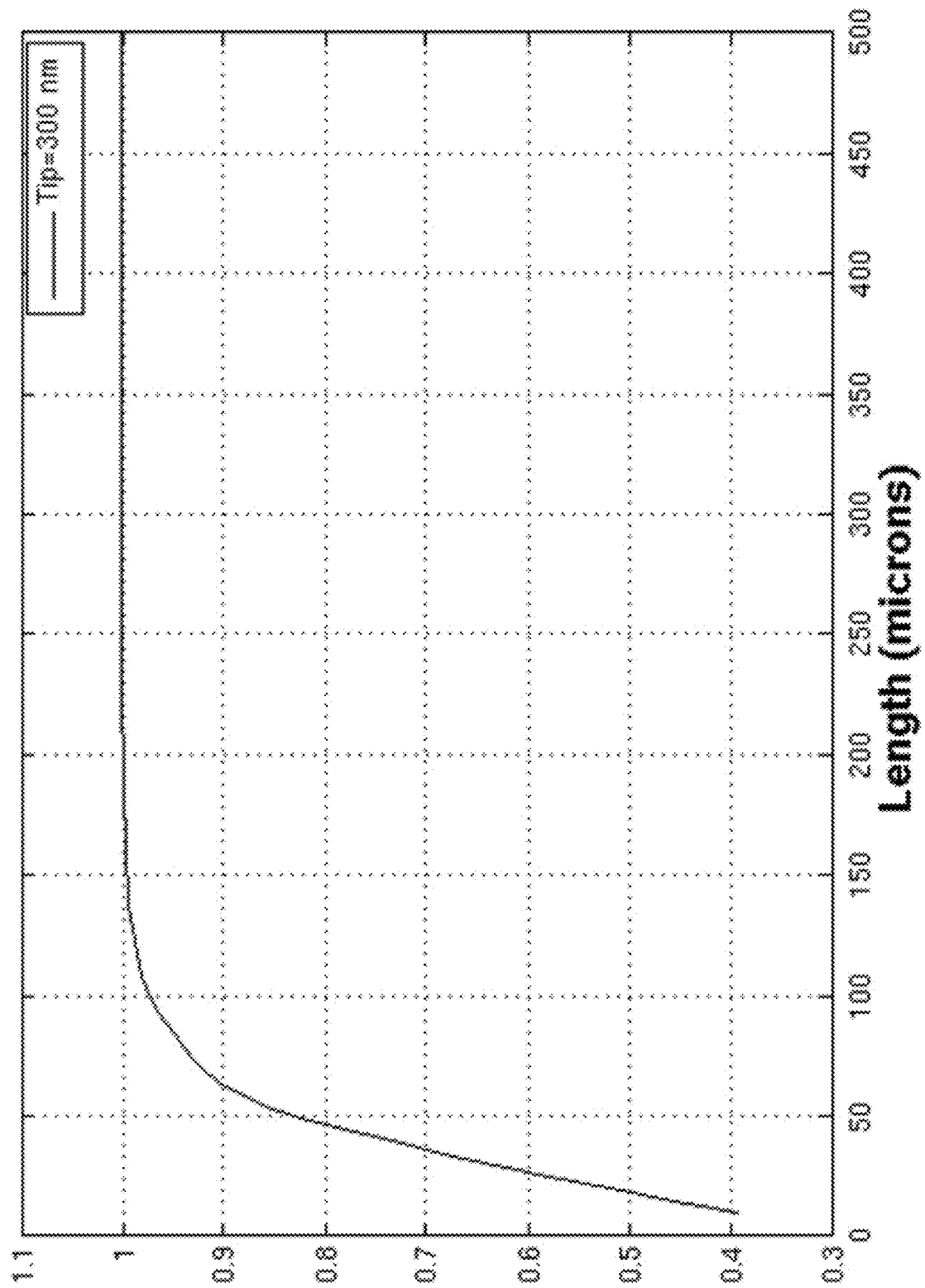
FIG. 17 is a diagram of light transmission through the taper as a function of the taper length of the SSC in the optical device of FIG. 16.

FIG. 17 is a diagram illustrating light transmission through the taper as a function of the taper length of the longest stage of the 3-stage spot size converter of FIG. 16.

In FIG. 17, the vertical axis shows the light transmission through the taper, and the horizontal axis shows the length of the taper. It can be seen that, after the taper length reaches about 100 μm, the light transmission does not appear to be sensitive to the change in taper length.

Figure 18:
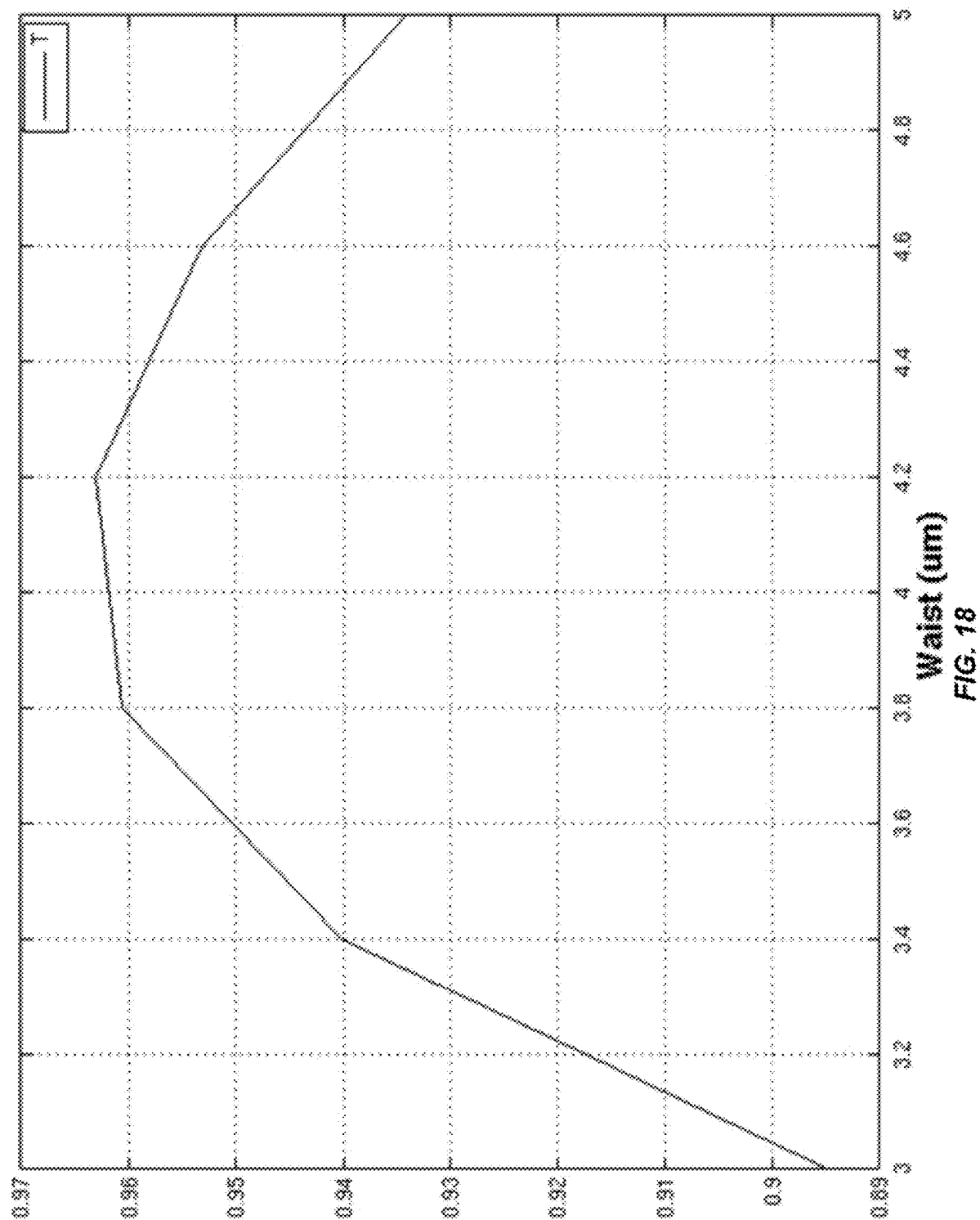
FIG. 18 is a diagram of light coupling between the spot size converter facet and a lensed fiber with a 2.5 µm spot size as a function of the SSC waist width in the optical device of FIG. 16.

FIG. 18 is a diagram of light coupling between the spot size converter facet and a lensed fiber with a spot size of 2.5 μm as a function of the SSC waist width shown in FIG. 16. In FIG. 18, the vertical axis shows the light coupling through the facet, and the horizontal axis shows the width of the waist of the facet. The waist refers to the region of the first stage at the output end of the SSC. It can be seen that light coupling appears to reach a peak at a waist width of about 4.2 μm, and only exhibits small variations in the plotted width range.

Figure 19:
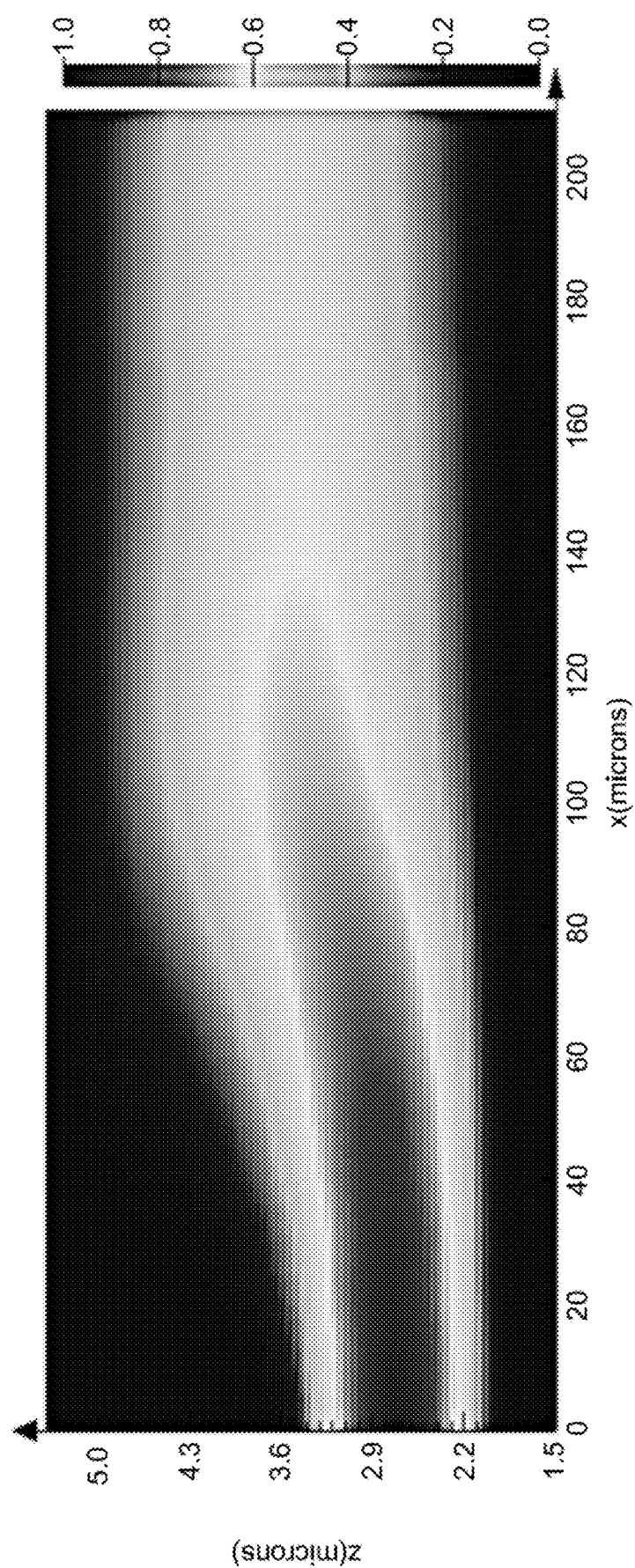
FIG. 19 is a diagram illustrating simulated optical signal strength along a longitudinal cross section of SSC in the optical device of FIG. 16.
Figure 20:
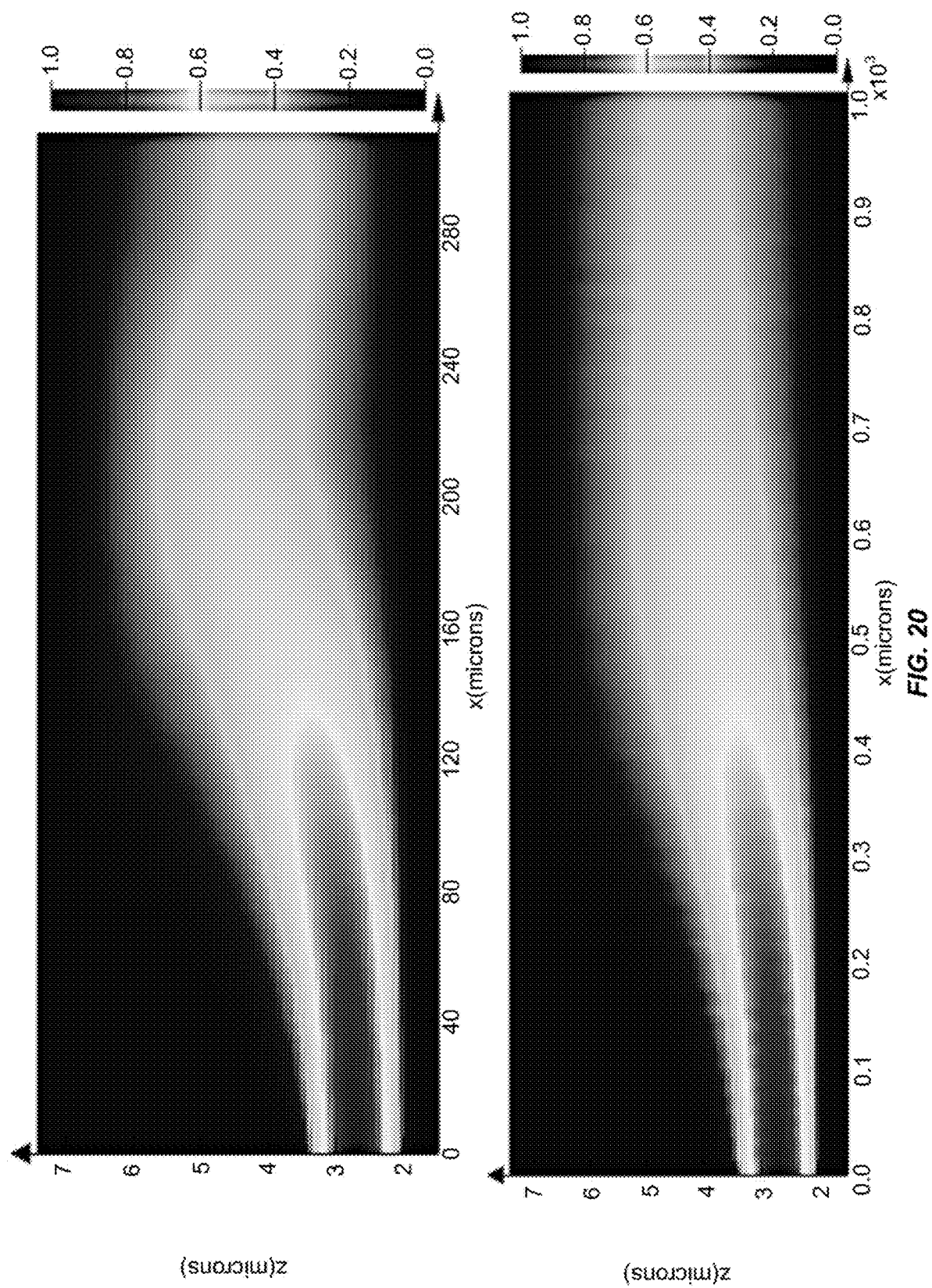
FIG. 20 is another diagram illustrating simulated optical signal strength along the longitudinal cross section of the spot size converter in the optical device of FIG. 16.

FIGS. 19 and 20 are a graph illustrating simulated optical signal strength along the longitudinal cross section of the spot size converter of FIG. 16 for three different taper lengths, 200 μm, 300 μm, and 1000 μm. In FIGS. 19 and 20, simulated profiles of a beam signal strength are shown, with a colored bar on the right indicating optical signal strength represented by each color. It can be seen that the small spot size of the beam with high intensity, at the input end on the left-hand side, is expanded as it is transmitted along the longitudinal direction through the spot size converter. These plots demonstrate that the fundamental mode evolves adiabatically without cross coupling out of the fundamental mode to higher order modes. The actual device can be considerably shorter than 1 mm; FIG. 17 suggests that a length of 150 μm or 200 μm would be sufficient; FIG. 20 demonstrates that the structure of Fi 16 will not couple power into higher order modes.

Figure 21:
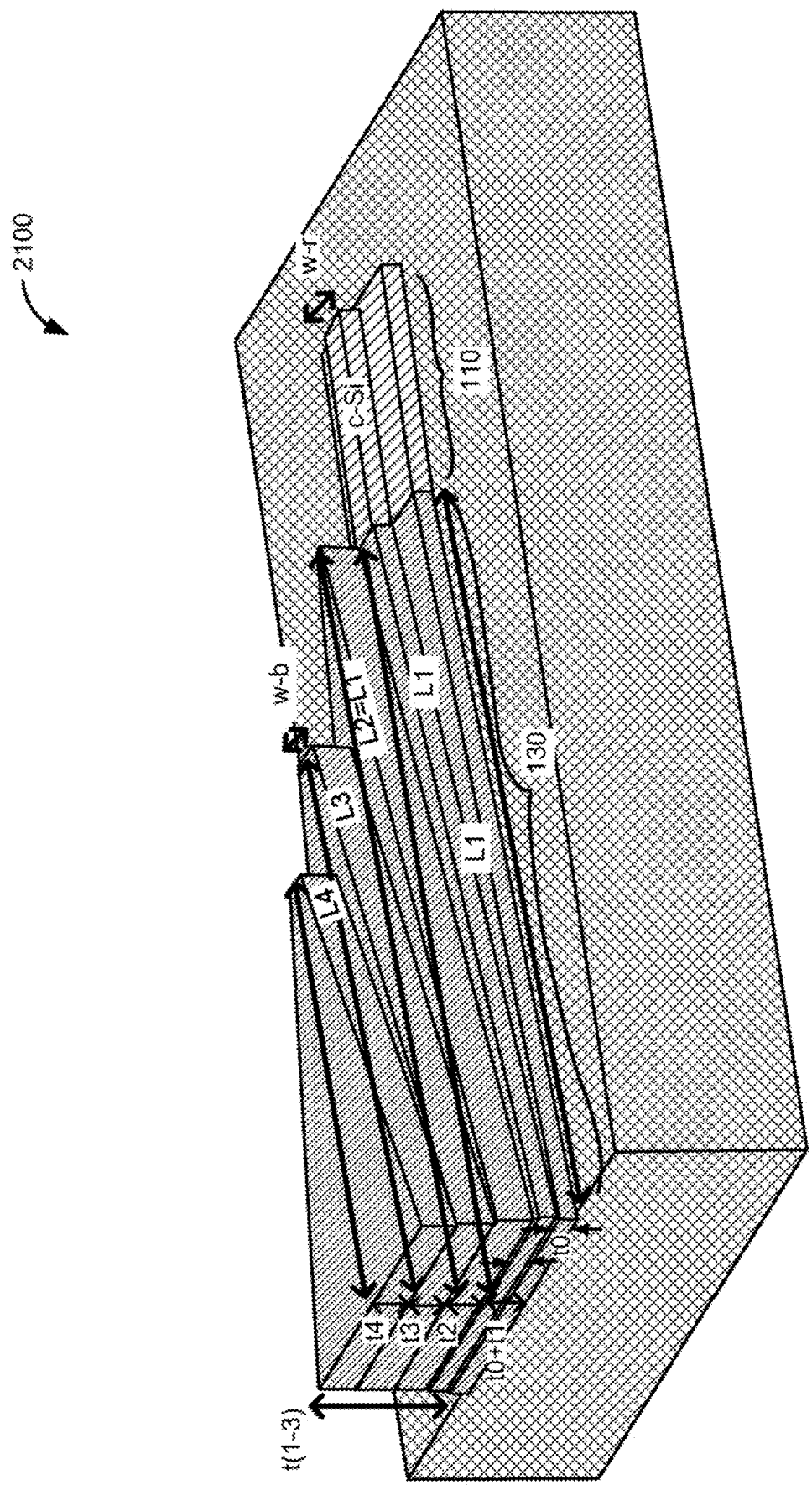
FIG. 21 is a perspective view diagram illustrating an optical device including a 4-stage spot size converter according to some embodiments of the present invention.

FIG. 21 is a perspective view diagram illustrating a 4-stage spot size converter (SSC) according to some embodiments of the present invention. As shown in FIG. 21, optical device 2100 includes a waveguide and spot size converter (SSC) integrated on a substrate. Optical device 2100 is similar to optical device 1600 in FIG. 16, with one additional stage formed over the structure of optical device 1600. The fourth stage has a length of L4 and a thickness t4, and tapers to greater widths at the output end. Similar to device 1600, the ridge of the waveguide and the first stage of the ridge portion of the SSC in FIG. 21 can be formed using a self-aligned process described above as can be the shoulder of the waveguide and the shoulder of the SSC. The additional four stages can be formed using the method described in U.S. application Ser. No. 14/615,942, filed on Feb. 6, 2015, incorporated by reference in its entirety for all purposes. Further, optical device 2100 shown in FIG. 21 can be tested by coupling to a lensed fiber in passive test 3 as described above in connection to FIG. 3.

Figure 22:
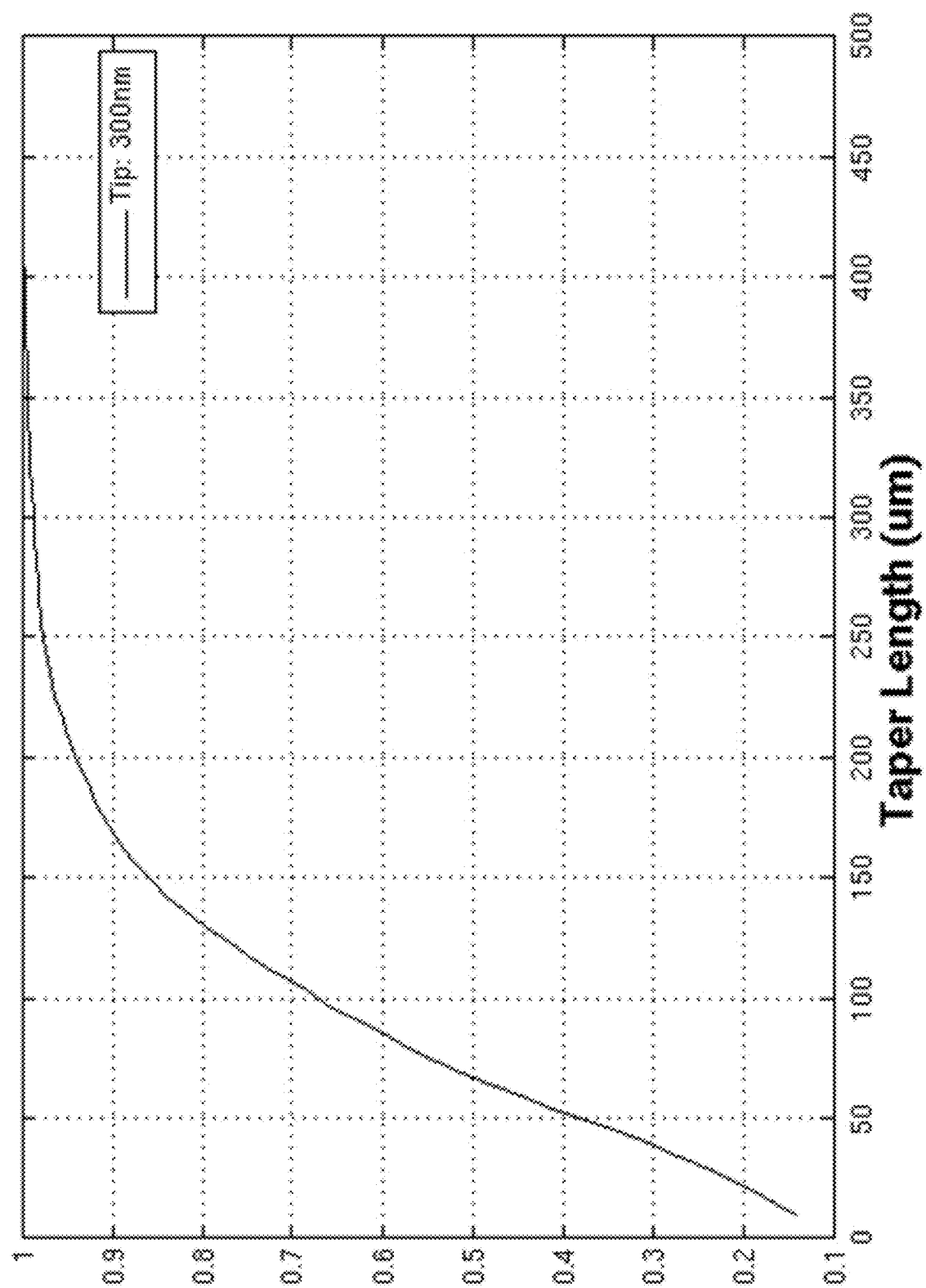
FIG. 22 is a diagram of light transmission through the SSC as a function of the length of the taper of the spot size converter of FIG. 21.

FIG. 22 is a diagram of light transmission through the taper as a function of the taper length of the spot size converter of FIG. 21. In FIG. 22, the vertical axis shows the light transmission through the taper, and the horizontal axis shows the length of the taper of the longest stage. It can be seen that, after the taper length reaches about 250 μm, the light transmission does not vary much with the change in taper length.

Figure 23:
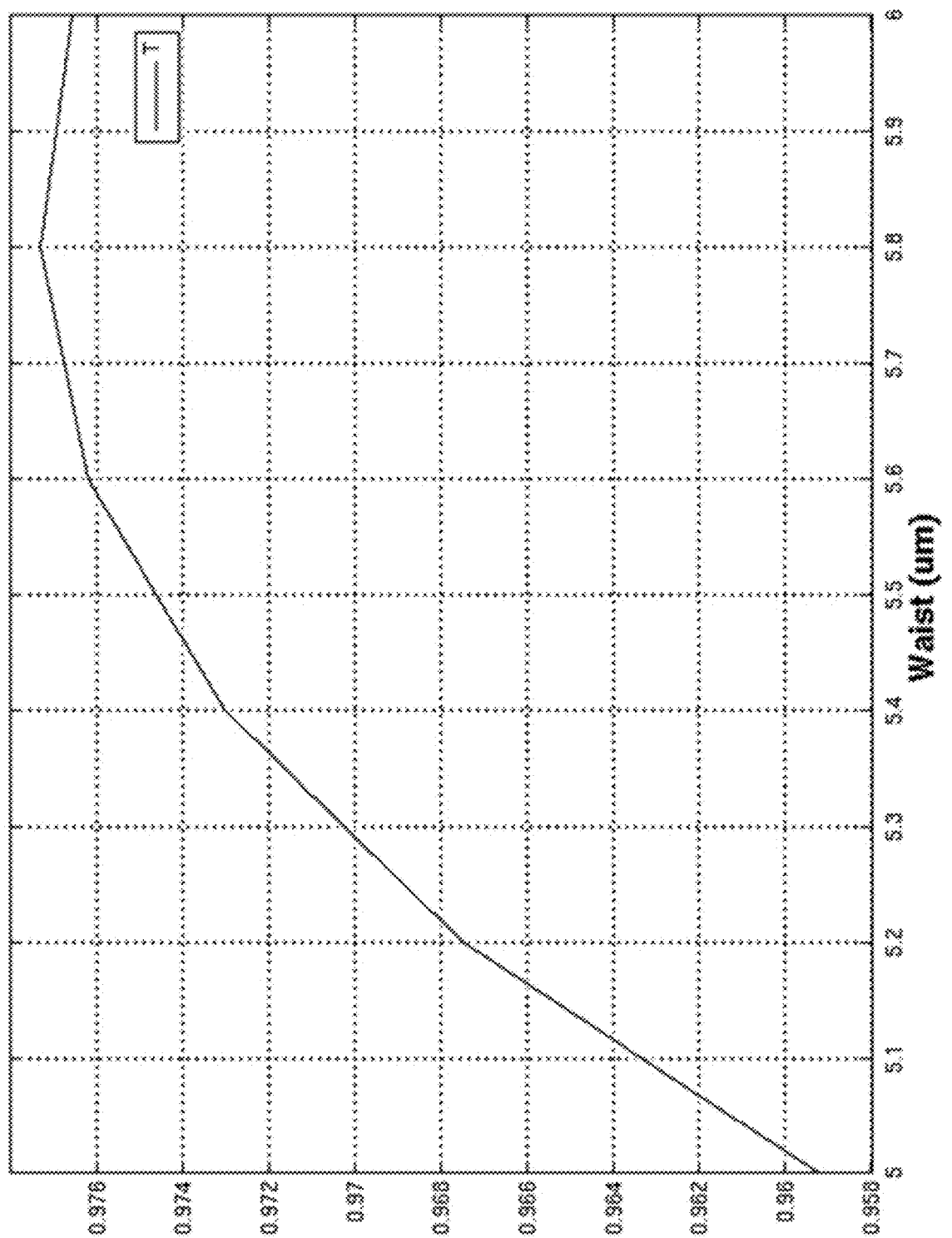
FIG. 23 is a diagram of light coupling between the spot size converter facet and a 3.5-µm lensed fiber as a function of the SSC waist width in the optical device of FIG. 21.

FIG. 23 is a diagram of light coupling between the spot size converter facet and a lensed fiber with a 3.5 μm spot size as a function of the SSC waist width shown in FIG. 21. In FIG. 23, the vertical axis shows the light coupling through the facet, and the horizontal axis shows width of the waist of the facet. It can be seen that light transmission appears to reach a peak at a waist width of about 5.8 μm, and only exhibits small variations in the plotted width range.

Figure 24:
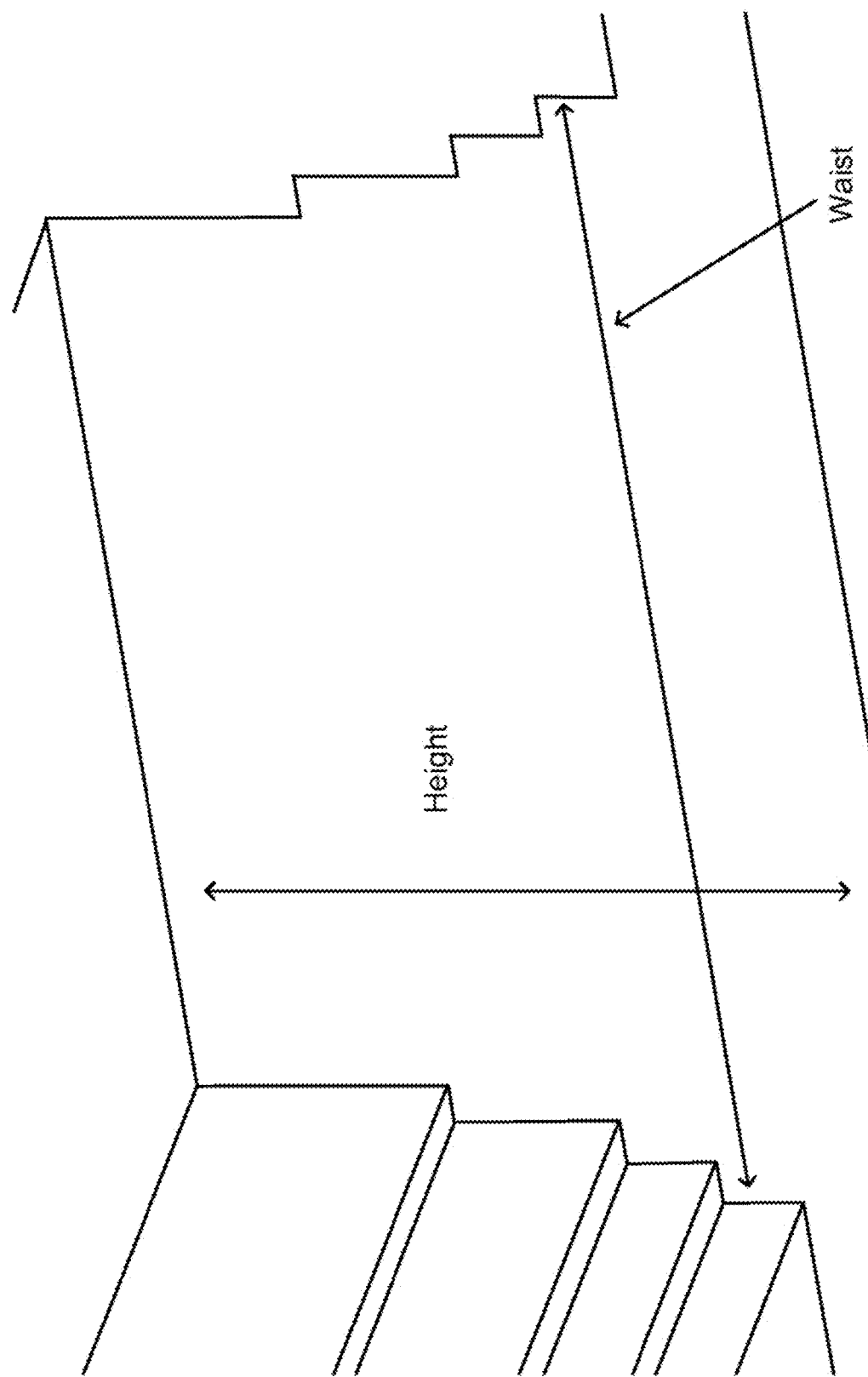
FIG. 24 is another perspective view diagram illustrating the spot size converter of FIG. 21 according to some embodiments of the present invention.

FIG. 24 is another perspective view diagram illustrating the spot size converter of FIG. 21 according to some embodiments of the present invention. FIG. 24 shows a perspective view of the 4-stage spot size converter of FIG. 21 from the output end.

Figure 25:
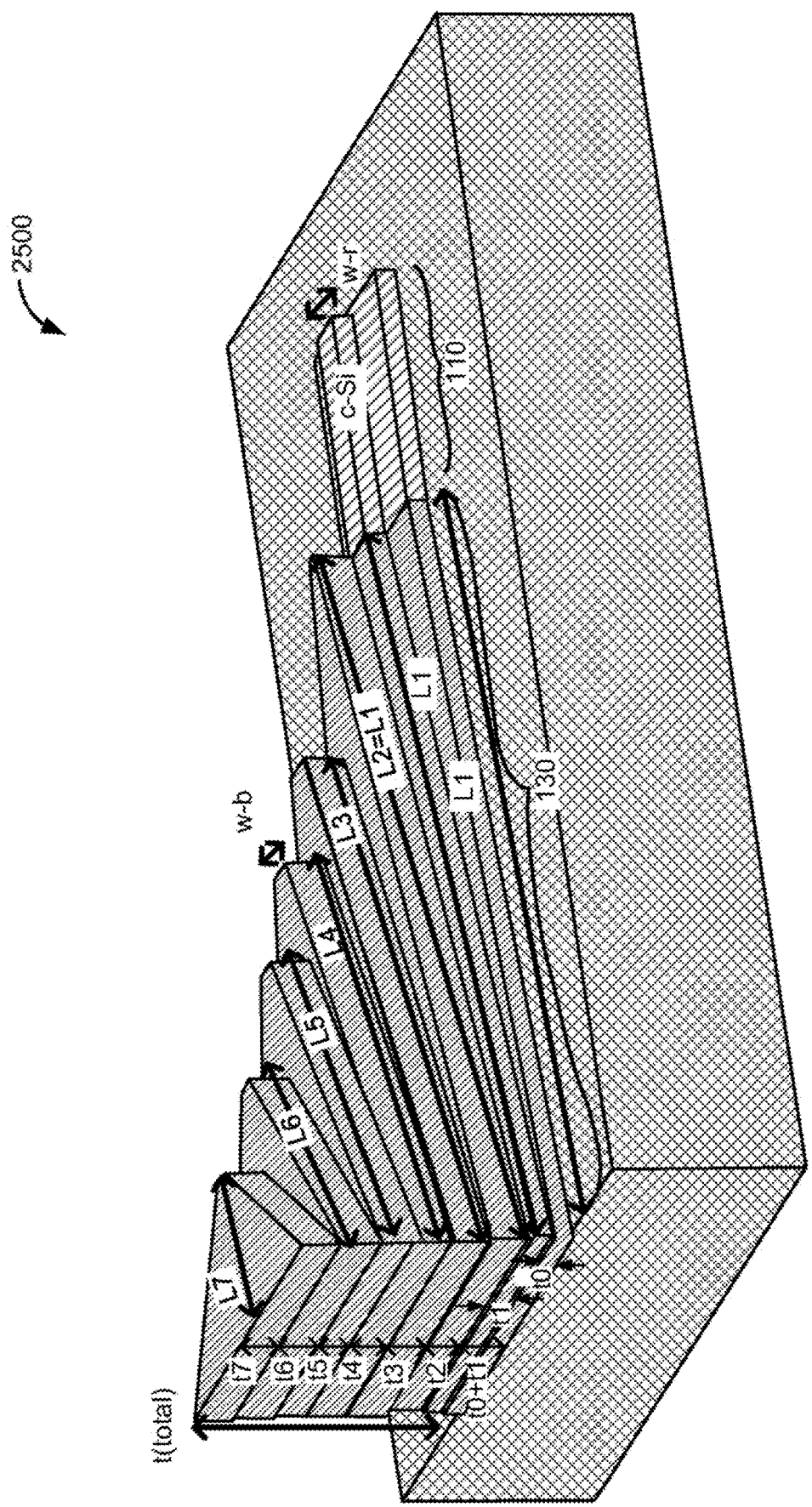
FIG. 25 is a perspective view diagram illustrating an optical device including a 7-stage spot size converter according to some embodiments of the present invention.

FIG. 25 is a perspective view diagram illustrating a 7-stage spot size converter according to some embodiments of the present invention. As shown in FIG. 25, optical device 2500 includes a waveguide and a seven-stage spot size converter (SSC) integrated on a substrate. Optical device 2500 is similar to optical device 2100 in FIG. 21, with three additional stages formed over the structure of optical device 2100. Similar to devices 1600 and 2100, the ridge of the waveguide and the first stage of the SSC in FIG. 25 can be formed using a self-aligned process described above. The additional seven stages can be formed using the method described in U.S. application Ser. No. 14/615,942, filed on Feb. 6, 2015, incorporated by reference in its entirety for all purposes.

Figure 26:
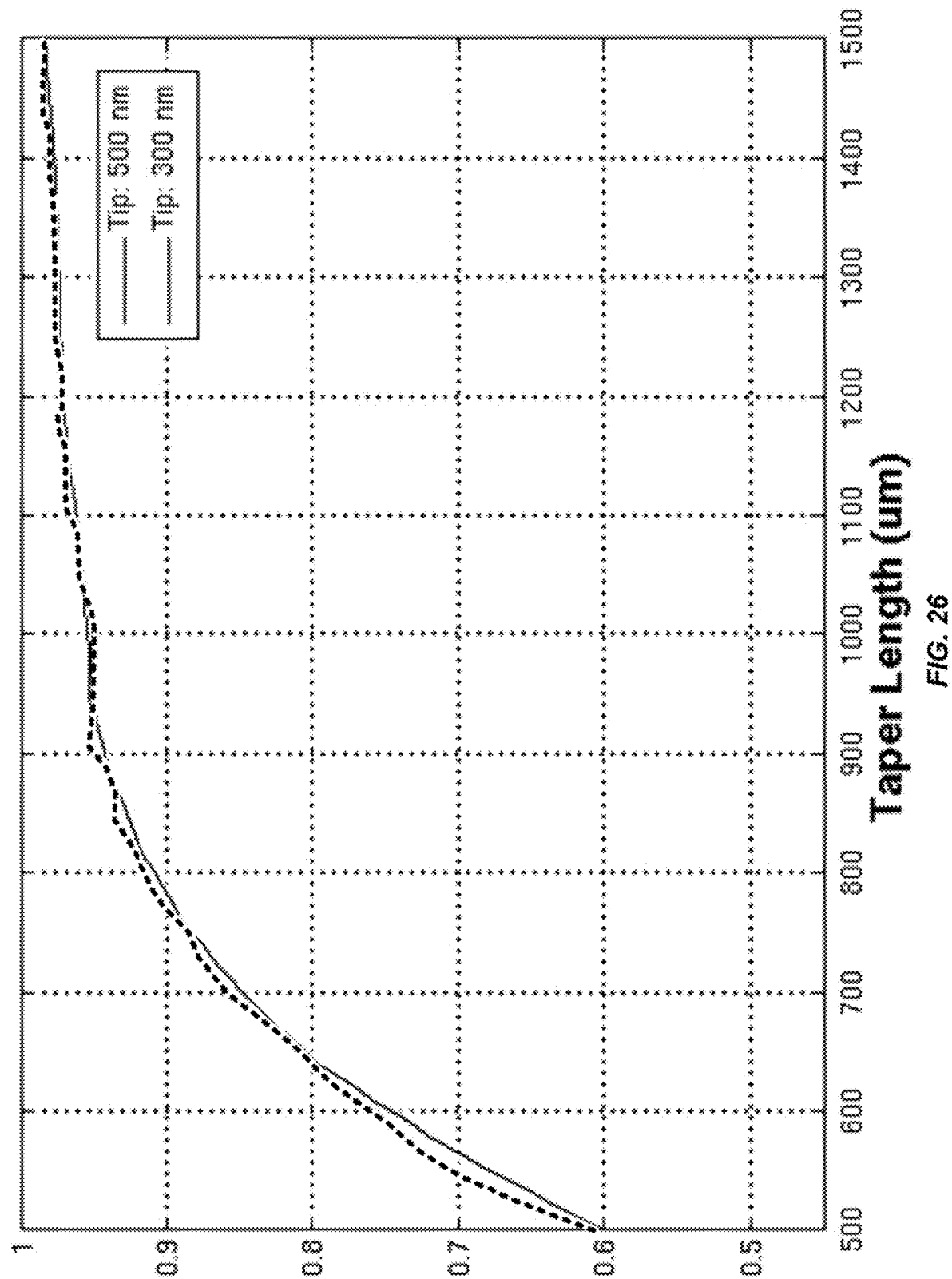
FIG. 26 is a diagram of light transmission through the SSC as a function of the taper length of the spot size converter of FIG. 25.

FIG. 26 is a diagram of light transmission through the taper as a function of the taper length of the spot size converter of FIG. 25. In FIG. 26, the vertical axis shows the light transmission through the taper, and the horizontal axis shows plots of light transmission through the taper versus the length of the taper of the longest stage. Two plots are shown for two devices having different tip widths, w-b. It can be seen that, after the taper length reaches 1000 μm, the light transmission varies less with the change in taper length. Further, the light transmission appears to be insensitive to variations in the tip width.

Figure 27:
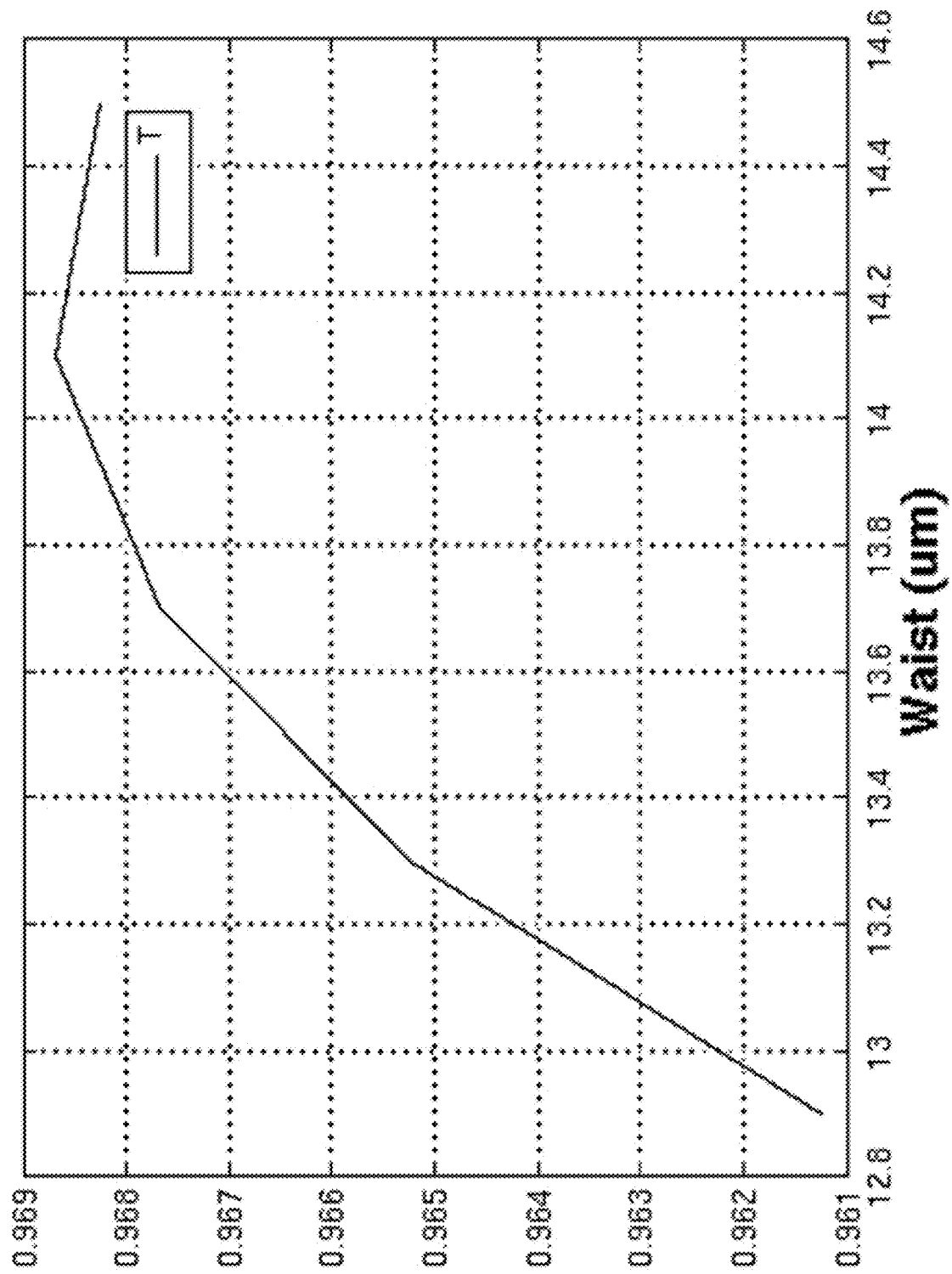
FIG. 27 is a diagram of light coupling between the spot size converter facet and a cleaved single mode fiber as a function of the SSC waist width in the optical device of FIG. 25.

FIG. 27 is a diagram of light coupling between the SSC facet and a cleaved facet of a single mode fiber as a function of the SSC waist width shown in FIG. 25. In FIG. 27, the vertical axis shows the light coupling through the facet, and the horizontal axis shows width of the waist of the facet. The waist refers to the region of the first stage of the SSC at the output end. It can be seen that light transmission appears to reach a peak at a waist width of about 14.1 μm, and only exhibits small variations in the plotted width range.

The specific details of particular embodiments may be combined in any suitable manner without departing from the spirit and scope of embodiments of the invention. However, other embodiments of the invention may be directed to specific embodiments relating to each individual aspect, or specific combinations of these individual aspects.

The above description of exemplary embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated.

A recitation of "a", "an," or "the" is intended to mean "one or more" unless specifically indicated to the contrary.

All patents, patent applications, publications, and descriptions mentioned here are incorporated by reference in their entirety for all purposes. None is admitted to be prior art.

What is claimed is:

1. An optical device, comprising:
   a substrate;
   a waveguide disposed on the substrate; and
   a spot size converter (SSC) disposed on the substrate, a waveguide end coupled to the SSC;

wherein:
the waveguide comprises a shoulder and a ridge located over the shoulder, the ridge extending a length of the shoulder;
the SSC comprises a shoulder and a ridge located over the shoulder of the SSC;
the ridge of the waveguide is aligned to a first stage of the ridge of the SSC;
the waveguide is made of a first material; and
the shoulder and the ridge of the SSC are made of a second material, the second material being different from the first material.

2. The optical device of claim 1, wherein the shoulder of the waveguide has a first width and the shoulder of the SSC has a second width, the second width being greater than the first width.

3. The optical device of claim 1, wherein:
the first material comprises crystalline silicon and the second material comprises amorphous silicon.

4. The optical device of claim 1, wherein:
the shoulder of the waveguide and the shoulder of the SSC have a first common width; and
the ridge of the waveguide and the first stage of the ridge of the SSC have a second common width.

5. The optical device of claim 1, wherein:
the shoulder of the waveguide and the shoulder of the SSC have a first common height; and
the ridge of the waveguide and the first stage of the ridge of the SSC have a second common height.

6. The optical device of claim 1, wherein the ridge of the SSC further comprises a second stage overlying the first stage, wherein:
both the first stage and the second stage are configured to taper and widen from an input end to an output end;
the first stage has a maximum width,
the second stage has a maximum width, and
the maximum width of the first stage is greater than the maximum width of the second stage.

7. The optical device of claim 6, wherein:
the first stage has a first length,
the second stage has a second length, and
the first length is equal to the second length.

8. The optical device of claim 1, wherein the ridge of the SSC comprises seven stages.

9. The optical device of claim 1, wherein:
the shoulder of the waveguide and the shoulder of the SSC have a first common width;
the ridge of the waveguide and the first stage of the ridge of the SSC have a second common width;
the shoulder of the waveguide and the shoulder of the SSC have a first common height; and
the ridge of the waveguide and the first stage of the ridge of the SSC have a second common height.

10. The optical device of claim 9, wherein the first material comprises crystalline silicon and the second material comprises amorphous silicon.

11. The optical device of claim 10, wherein the ridge of the SSC further comprises multiple stages located above the first stage.

12. The optical device of claim 1, wherein:
the shoulder of the waveguide has a first width and the shoulder of the SSC has a second width, the second width being greater than the first width;
the ridge of the waveguide and the first stage of the ridge of the SSC have a second common width;
the shoulder of the waveguide and the shoulder of the SSC have a first common height; and
the ridge of the waveguide and the first stage of the ridge of the SSC have a second common height.

* * * * *